United States Patent
Takano

[19]

[11] Patent Number: 6,065,132
[45] Date of Patent: *May 16, 2000

[54] INFORMATION PROCESSING SYSTEM HAVING A CPU FOR CONTROLLING ACCESS TIMINGS OF SEPARATE MEMORY AND I/O BUSES

[75] Inventor: Toshiya Takano, Hokkaido, Japan

[73] Assignee: Hudson Soft Co., Ltd., Sapporo, Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/084,385

[22] Filed: May 27, 1998

Related U.S. Application Data

[62] Division of application No. 08/971,405, Nov. 17, 1997, Pat. No. 5,822,753, which is a continuation of application No. 08/129,611, Sep. 30, 1993, abandoned.

[30] Foreign Application Priority Data

| Oct. 1, 1992 | [JP] | Japan | 4-284983 |
| Oct. 1, 1992 | [JP] | Japan | 4-284984 |
| Oct. 1, 1992 | [JP] | Japan | 4-284986 |
| Oct. 1, 1992 | [JP] | Japan | 4-284987 |
| Oct. 7, 1992 | [JP] | Japan | 4-293767 |

[51] Int. Cl.[7] .................................................. G06F 1/04
[52] U.S. Cl. ..................... 713/600; 710/124; 710/127; 710/128; 710/130; 711/167; 711/173; 713/502
[58] Field of Search ..................... 711/105, 167, 711/173; 710/124, 127, 128, 130; 713/502, 600, 500

[56] References Cited

U.S. PATENT DOCUMENTS

| 3,704,453 | 11/1972 | Blackwell et al. ..................... 710/21 |
| 4,466,055 | 8/1984 | Kinoshita et al. ..................... 710/128 |
| 4,509,113 | 4/1985 | Heath ..................... 710/66 |
| 4,556,952 | 12/1985 | Brewer et al. ..................... 711/106 |
| 4,571,676 | 2/1986 | Mantellina et al. ..................... 711/172 |
| 4,809,234 | 2/1989 | Kuwashira ..................... 365/230.03 |
| 4,899,272 | 2/1990 | Fung et al. ..................... 365/230.03 |
| 4,908,789 | 3/1990 | Blokkum et al. ..................... 711/172 |
| 4,965,722 | 10/1990 | Tokuume ..................... 711/106 |
| 5,040,153 | 8/1991 | Fung et al. ..................... 365/230.03 |
| 5,129,069 | 7/1992 | Helm et al. ..................... 711/172 |
| 5,131,081 | 7/1992 | MacKenna et al. ..................... 710/22 |
| 5,179,686 | 1/1993 | White ..................... 711/172 |
| 5,201,036 | 4/1993 | Yoshimatsu ..................... 710/107 |
| 5,241,642 | 8/1993 | Norsworthy et al. ..................... 345/508 |
| 5,253,355 | 10/1993 | Grieff ..................... 711/167 |
| 5,307,320 | 4/1994 | Farrer et al. ..................... 365/230.01 |
| 5,325,513 | 6/1994 | Tanaka et al. ..................... 395/500 |
| 5,345,574 | 9/1994 | Sakurada et al. ..................... 711/115 |
| 5,347,641 | 9/1994 | Cedar et al. ..................... 711/200 |
| 5,379,400 | 1/1995 | Barakat et al. ..................... 711/106 |
| 5,386,537 | 1/1995 | Asano ..................... 711/157 |
| 5,394,541 | 2/1995 | Chesley et al. ..................... 711/167 |
| 5,404,543 | 4/1995 | Faucher et al. ..................... 713/323 |
| 5,418,924 | 5/1995 | Dresser ..................... 711/167 |
| 5,448,710 | 9/1995 | Liu ..................... 711/172 |
| 5,522,062 | 5/1996 | Yamaki ..................... 711/172 |
| 5,522,064 | 5/1996 | Aldereguira et al. ..................... 713/501 |
| 5,630,163 | 5/1997 | Fung et al. ..................... 710/127 |
| 5,740,404 | 4/1998 | Baji ..................... 711/167 |
| 5,822,753 | 10/1998 | Takano ..................... 711/106 |

Primary Examiner—Hiep T Nguyen
Attorney, Agent, or Firm—McDermott, Will & Emery

[57] ABSTRACT

In an information processing system, a wait state signal is inserted into a RDY signal, according to which data are transmitted through memory and I/O buses. A CPU controls the number of the wait state signal to adjust the difference of the transfer speeds of the memory and I/O buses. An MCU (Memory Controller Unit) includes configuration and refresh timer registers for specifying the configuration and the refresh cycle of a memory to be accessed.

7 Claims, 29 Drawing Sheets

F I G. 1 5
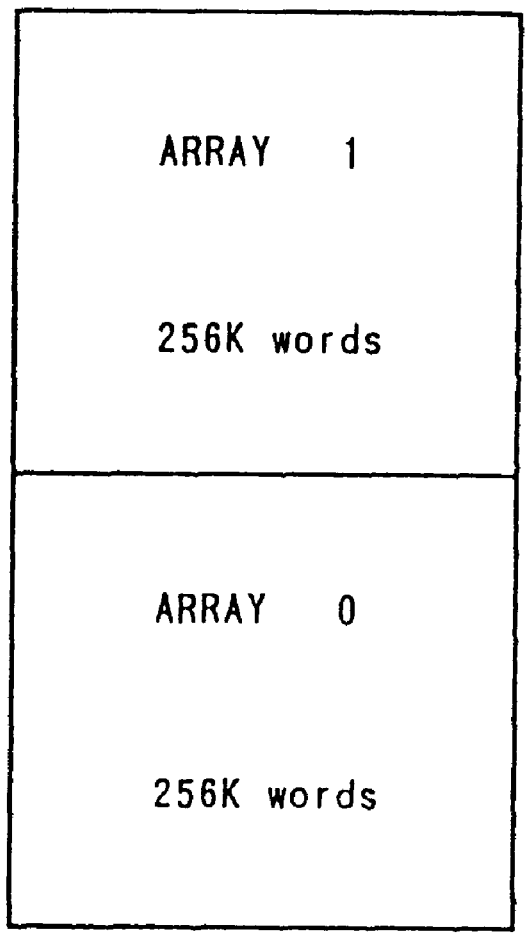
0×00  FFFC
0×04  0004
0×04  0000
0×03  FFFC
.
.
.
.
0×00  0004
0×00  0000
ADDRESS

F I G .  1 6

| TYPE OF DRAM | | 1 ARRAY | 2 ARRAYS |
|---|---|---|---|
| 64K × 16 | word | 64 KW | 128 KW |
| (ROW × COL | byte | 256 KB | 512 KB |
| 8 × 8) | chip | 2 | 4 |
| 128K × 8 | word | 128 KW | 256 KW |
| (ROW × COL | byte | 512 KB | 1 MB |
| 9 × 8) | chip | 4 | 8 |
| 256K × 4 | word | 256 KW | 512 KW |
| (ROW × COL | byte | 1 MB | 2 MB |
| 9 × 9) | chip | 8 | 16 |
| 256K × 16 | word | 256 KW | 512 KW |
| (ROW × COL | byte | 1 MB | 2 MB |
| 9 × 9) | chip | 2 | 4 |
| 512K × 8 | word | 512 KW | 1 MW |
| (ROW × COL | byte | 2 MB | 4 MB |
| 10 × 9) | chip | 4 | 8 |
| 1M × 4 | word | 1 MW | 2 MW |
| (ROW × COL | byte | 4 MB | 8 MB |
| 10 × 10) | chip | 8 | 16 |
| 1M × 16 | word | 1 MW | 2 MW |
| (ROW × COL | byte | 4 MB | 8 MB |
| 12 × 8) | chip | 2 | 4 |

F I G. 2 2
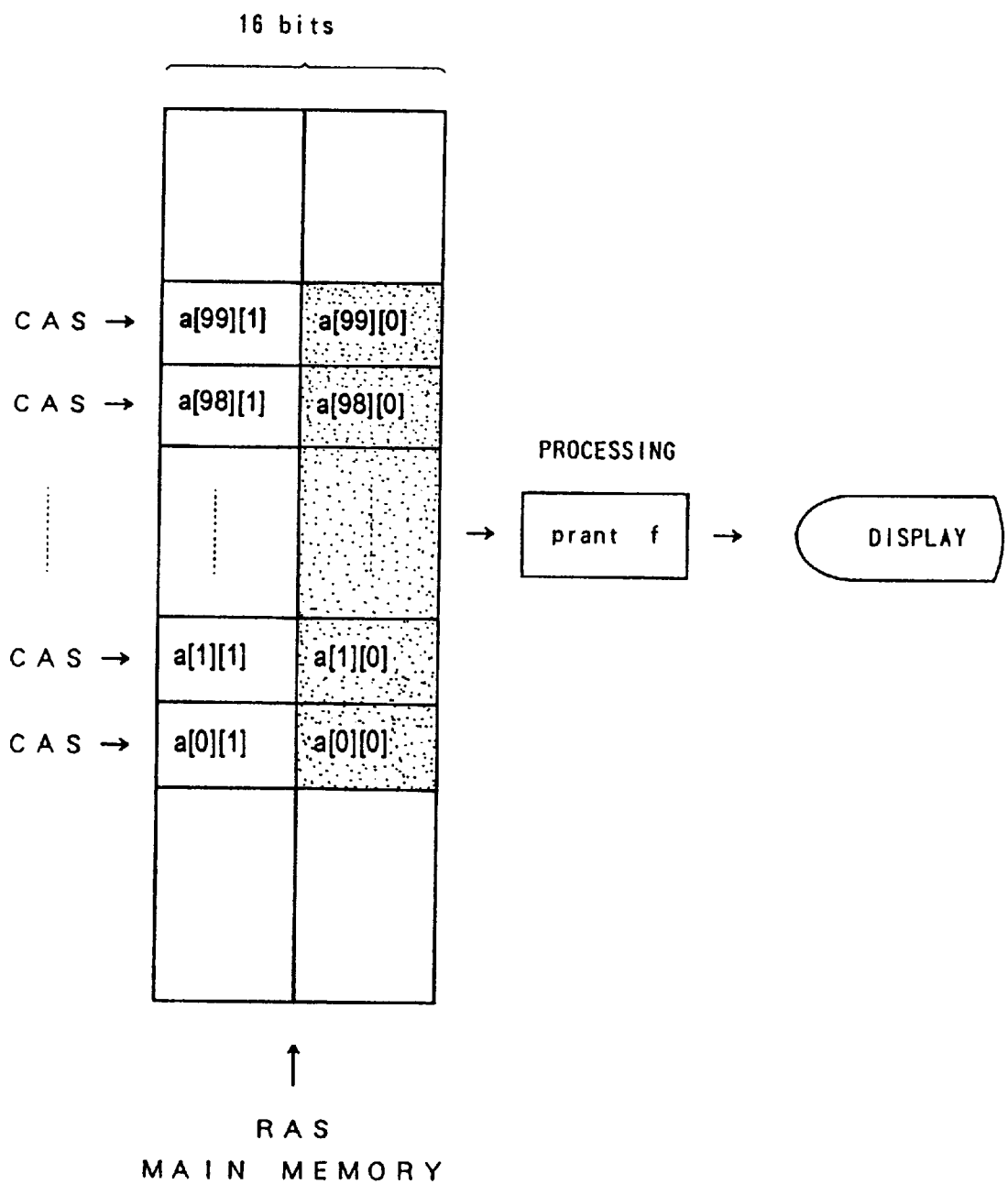

F I G. 2 3

```
         RAS CAS RAS CAS RAS CAS         RAS CAS
MADR     ─   ─   ─   ─   ─   ─  ......   ─   ─  ......

ACCESS           ─       ─       ─    ..........      ─    ......
         a[0][0]  a[1][0] a[2][0]              a[99][0]
```

F I G. 2 4

```
         RAS CAS CAS CAS                CAS
MADR     ─   ─   ─   ─  ..........      ─   ......

ACCESS           ─       ─      ─   ..........     ─   ......
         a[0][0] a[1][0] a[2][0]             a[99][0]
```

INFORMATION PROCESSING SYSTEM HAVING A CPU FOR CONTROLLING ACCESS TIMINGS OF SEPARATE MEMORY AND I/O BUSES

This application is a division of application Ser. No. 08/971,405 filed Nov. 17, 1997, now U.S. Pat. No. 5,822,753, which is a continuation of application Ser. No. 08/129,611 filed Sep. 30, 1993, now abandoned.

BACKGROUND OF THE INVENTION

The present invention relates to an information processing system, and more particularly to a game computer system processing both image and sound data.

In a computer system, a CPU and peripheral devices are connected with each other through control, address and data buses. The CPU is connected to a memory and I/O devices through memory and I/O buses, respectively. In such a system, the following instructions are repeated to transfer data from the memory to the I/O spaces (I/O devices) continuously:

READ DATA FROM MEMORY
WRITE DATA TO I/O

In a general computer system, the following instruction for reading or writing is prepared after the current process has been completed.

A game computer system which works at a high speed includes a CPU that processes the following instruction while the current instruction is being in process, this process being known as a DMA (Direct Memory Access) function. According to this system, data to be transmitted are accumulated on the memory bus, because the I/O bus transmits data slower than the memory bus. As a result, the computer system can not perform pipeline processing normally.

Accordingly, in one type of conventional game computer system, timing for transmitting data is controlled by a user program with NOP (NO Operation) instructions. That is, the following program is used to transfer data from the memory to the I/O space:

READ DATA FROM MEMORY
WRITE DATA TO I/O
NOP

In this case, the transmission timing is adjusted by the NOP instruction after the data are written into the I/O space.

The following program is used to transfer data from the I/O space to the memory:

READ DATA FROM I/O
NOP
WRITE DATA TO MEMORY

According to the program, the data are transmitted from the CPU to the memory securely.

Recently, with development of high performance CPUs, peripheral devices must be accessed with exact timings which are controlled by a program.

Generally, in an information processing system, the configuration of a DRAM (dynamic random access memory) is different depending on the type of data to be processed and the capacity of the memory, that is, the DRAM is addressed for each 8 and 16 bits when 8 and 16 bit data are to be processed, respectively. Most conventional computer systems employ decode IC chips for generating addresses fitting a variety of memory configurations.

FIG. 1 shows a memory of 64K×2 chip type, according to a conventional computer system. When address information is supplied to a decode IC, corresponding data in the memory are accessed by the decode IC. According to this system, the decode IC is necessary and the memory configurations are limited, and therefore, it is difficult to access a variety of memories having different configurations.

The memory (DRAM) is composed of plural memory cells each composed of a transistor and a capacitor to decrease its cost and to increase its integration rate. The DRAM is accessed by an address multiplex system to decrease the size of the system, as shown in FIG. 2. In this system, address signals are supplied to address terminals by a time division system, as shown in FIG. 3.

The DRAM is accessed in a high speed access mode to increase the access speed. In this mode, a word line is selected in accordance with a row address to supply all data connected with the word line to corresponding sense amplifiers, and then one of the amplifiers is selected in accordance with a column address to obtain data to be accessed. After that, when the column address only is changed, data stored in another sense amplifier is accessed.

When data are read from a memory in a read cycle, the memory is accessed by repeating RAS (Row Addressing) and CAS (Column addressing) cycles alternately, the cycle being called an "MADR cycle," and the access system a "page mode access." According to this system, much data can not be accessed at a high speed, this problem being serious for graphic data processing that needs to treat much continuous data.

Accordingly, another type of conventional computer systems employs a cache memory managed directly by a CPU, as shown in FIG. 5. The cache memory stores data read from a DRAM, so that the CPU reads the data from the cache memory directly, not from the DRAM. If the cache memory stores no data to be accessed by the CPU, the CPU must accesses the DRAM. For that reason, the cache memory is necessary to store enough data.

According to the conventional system, however, it is difficult to debug the program, because the CPU points to addresses in the cache memory, not in the main memory (DRAM). It is difficult to find the locations of program errors. Further, the system needs an extra memory chip for the cache memory in addition to the main memory (DRAM), and therefore, the hardware becomes complicated in structure.

In the conventional computer system, when the CPU is connected to peripheral devices of different types of bit (width), data to be transmitted are adjusted in width by software. For instance, when data are transferred from an 8-bit device to a 16-bit device, eight zeros are added at the end of 8 bit data to be transferred, as shown in FIG. 6. On the other hand, when data are transferred from a 16-bit device to an 8-bit device, the 16 bit data are divided into two pieces of 8 bit data to be transferred, as shown in FIG. 7. According to the conventional system, a program (software) must be designed in consideration of the width of data to be transmitted.

In general, an area out of a memory space is not addressed, when an application program is designed in a high-level language, because the memory is treated with variables. On the other hand, in a system program or application program which is designed using a low-level language, such as an assembler language, an address out of the memory may be specified.

In the conventional system, if a nonexistent address space is addressed, an incomprehensible image is displayed on a CRT. For example, in a game computer system dealing with sound and image, a strange image is displayed on a screen if a nonexistent address of a memory is specified.

FIG. 8 shows a memory space of the conventional system. Generally, the memory space to be addressed by the CPU is different from a space $(0000)_{16}$ to $(1000)_{16}$ for the actual memory (DRAM) region. In the conventional system, when the program specifies an address $(3000)_{16}$, an address decoder (address IC chip) analyzes the address as being an address $(1000)_{16}$, because the decoder ignores the addresses over the upper boundary address $(1000)_{16}$, as shown in FIG. 9. Although no datum exists at address $(3000)_{16}$, the system judges as if predetermined data exist there.

According to the conventional system, however, when a strange image is displayed on the screen, it is difficult to find the error location, because a programmer tends to guess that proper image data might have some errors, and therefore, the error can not be found in the worst case. In more detail, when a nonexistent memory area is accidentally specified, other data or instruction is broken, and therefore, an error occurs when the data or instruction is later accessed. Although an exceptional error may stop the processing when the instruction is broken, the error portion can not be found in debugging, because the error is based on the wrong addressing.

SUMMARY OF THE INVENTION

Accordingly, it is an object of the present invention to provide an information processing system, in which the difference of data processing speeds between a memory bus and an I/O bus is adjusted by a CPU to ease the burden of a programmer.

It is another object of the present invention to provide an information processing system, in which a memory may be accessed flexibly to manage a variety of memory having different configurations.

It is another object of the present invention to provide an information processing system, in which a CPU may access a memory at a high speed without a cache memory.

It is another object of the present invention to provide an information processing system, in which a variety of types of peripheral devices may be managed easily.

It is still another object of the present invention to provide an information processing system, in which an addressing error may be found easily.

According to a first feature of the present invention, a wait state signal is inserted into a RDY signal to adjust the difference of the transfer speeds of memory and I/O buses, which are connected to a CPU.

According to a second feature of the present invention, an MCU is provided with configuration and refresh timer registers for specifying the configuration and the refresh cycle of a memory to be accessed, respectively.

According to a third feature of the present invention, an MCU (Memory Controller Unit) divides an address signal into row and column addresses. The first row address is held when the same row address are supplied continuously so that a memory is accessed continuously only by changing the column address.

According to a fourth feature of the present invention, the width (number of bits) of data to be transmitted is adjusted to be compatible for a device to be accessed.

According to a fifth feature of the present invention, the configuration of a memory to be accessed is specified by a register. An error signal is generated when an area out of the actual memory area in a memory space is addressed, so that memory I/O error exceptional treatment is carried out.

BRIEF DESCRIPTION OF THE DRAWINGS

FIG. 15 is a diagram showing a memory map of the CPU, according to the second preferred embodiment.

FIG. 16 is a table showing specifications of memories, according to the second preferred embodiment.

FIG. 22 is a diagram illustrating the two-dimensional character arrangement of a main memory, according to the third preferred embodiment.

FIG. 23 is a diagram showing an access cycle in the page mode.

FIG. 24 is a diagram showing an access cycle in the fast page mode, according to the third preferred embodiment.

DETAILED DESCRIPTION OF THE INVENTION

Figure 10:
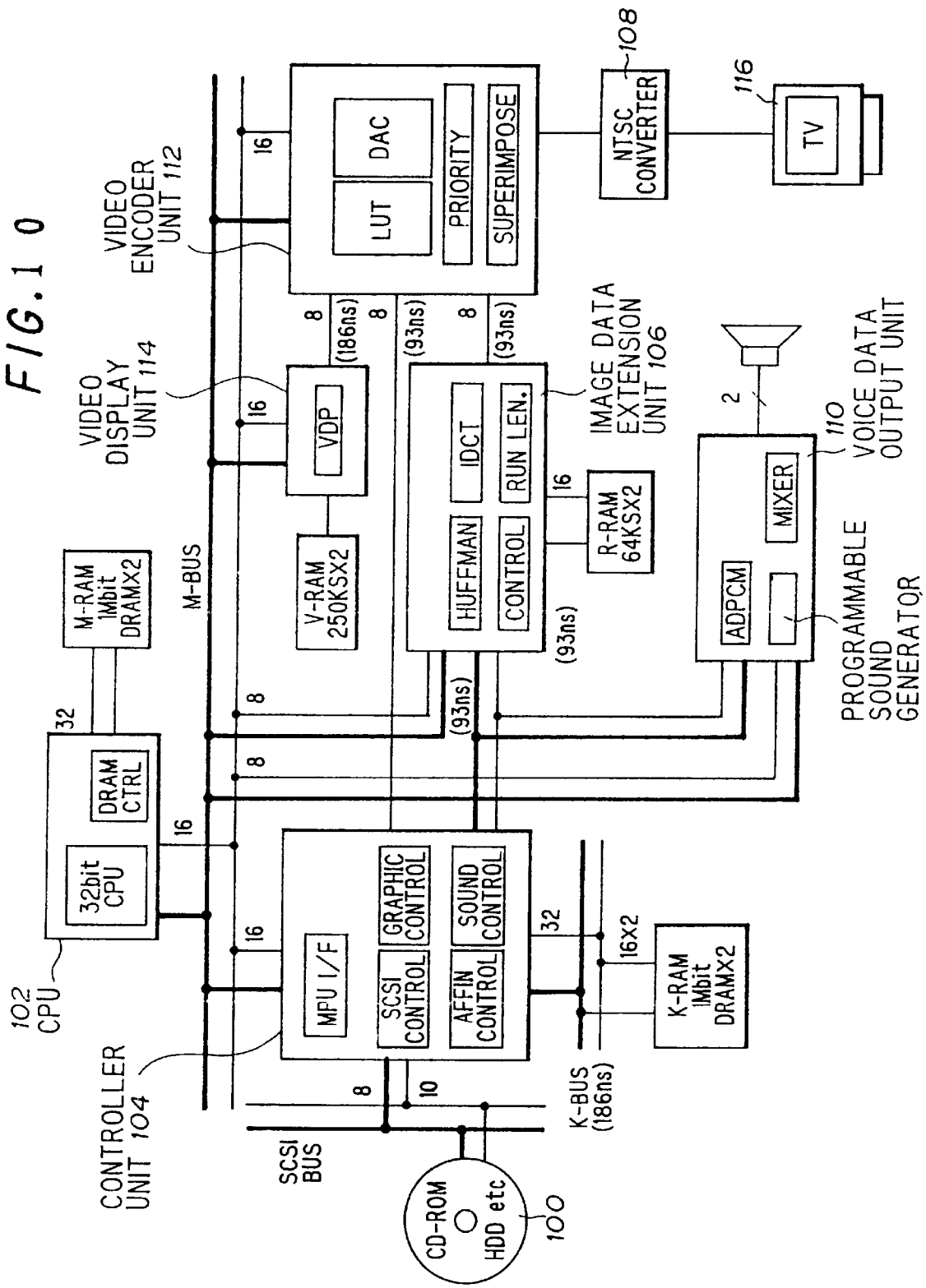
FIG. 10 is a block diagram illustrating a computer system according to the invention.

FIG. 10 shows a computer system of the invention, which includes a game-software recording medium 100 such as a CD-ROM, a CPU 102 of the 32-bit type, a control unit 104 for mainly controlling transmission of image and sound data and interfacing peripheral devices to each other, an image data extension unit 106, an image data output unit, a sound data output unit 110, a video encoder unit 112, a VDP unit 114 and a TV display 116.

CPU 102, control unit 104, image data extension unit 106 and VDP unit 114 are provided with their own memories M-RAM, K-RAM, R-RAM and V-RAM, respectively.

CPU 102 directly controls a DRAM via a memory support, and performs communication through an I/O port to peripheral devices, that is called an I/O control function. CPU 102 includes a timer, a parallel I/O port and an interruption control system. CPU 102 writes display data into the VRAM, and the data are read by VDP unit 114. The display data are transmitted to video encoder unit 112 whereby the data are displayed on the TV display 116.

Control unit 104 includes an SCSI controller to which image and sound data are supplied from CD-ROM 100 through an SCSI interface. The K-RAM buffers data supplied to the SCSI controller. Control unit 104 also includes a DRAM controller for reading data buffered in the K-RAM at a predetermined timing. In control unit 104, priority judgement is carried out for each dot of natural background image data. Control unit 104 transmits moving image data (full color, pallet), which have been compressed, to image data extension unit 106 to extend the image data.

Video encoder unit 112 receives an output signal of the control unit. Video encoder unit 112 superimposes VDP image data, natural background image data and moving image data (full color, pallet) transmitted from VDP unit 114, control unit 104 and image data extension unit 108. Video encoder unit 112 performs color pallet reproducing, special effect processing, D/A converting and the like. Output data of video encoder unit 112 are encoded into an NTSC signal by an external circuit.

ADPCM sound data recorded in CD-ROM 100 are buffered in the K-RAM and then transmitted to sound data output unit 110 under control of control unit 104. The sound data output unit reproduces the sound data.

Figure 11:
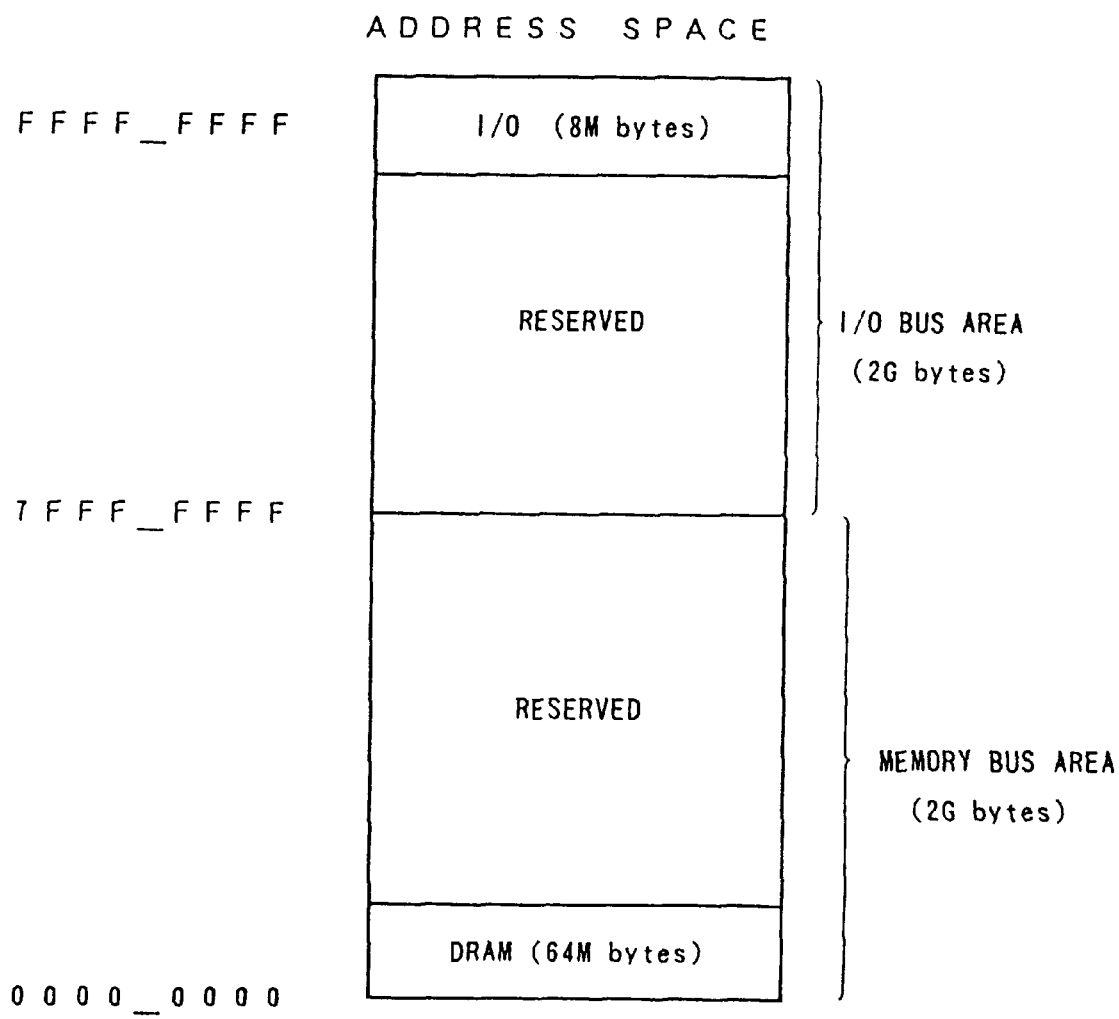
FIG. 11 is a diagram showing the address space of a CPU, according to a first preferred embodiment.

FIG. 11 shows the address space of a CPU according to a first preferred embodiment, which includes memory and I/O spaces of 2 G bytes. The CPU accesses the I/O space with some intervals to avoid jamming of a memory bus.

Figure 12:
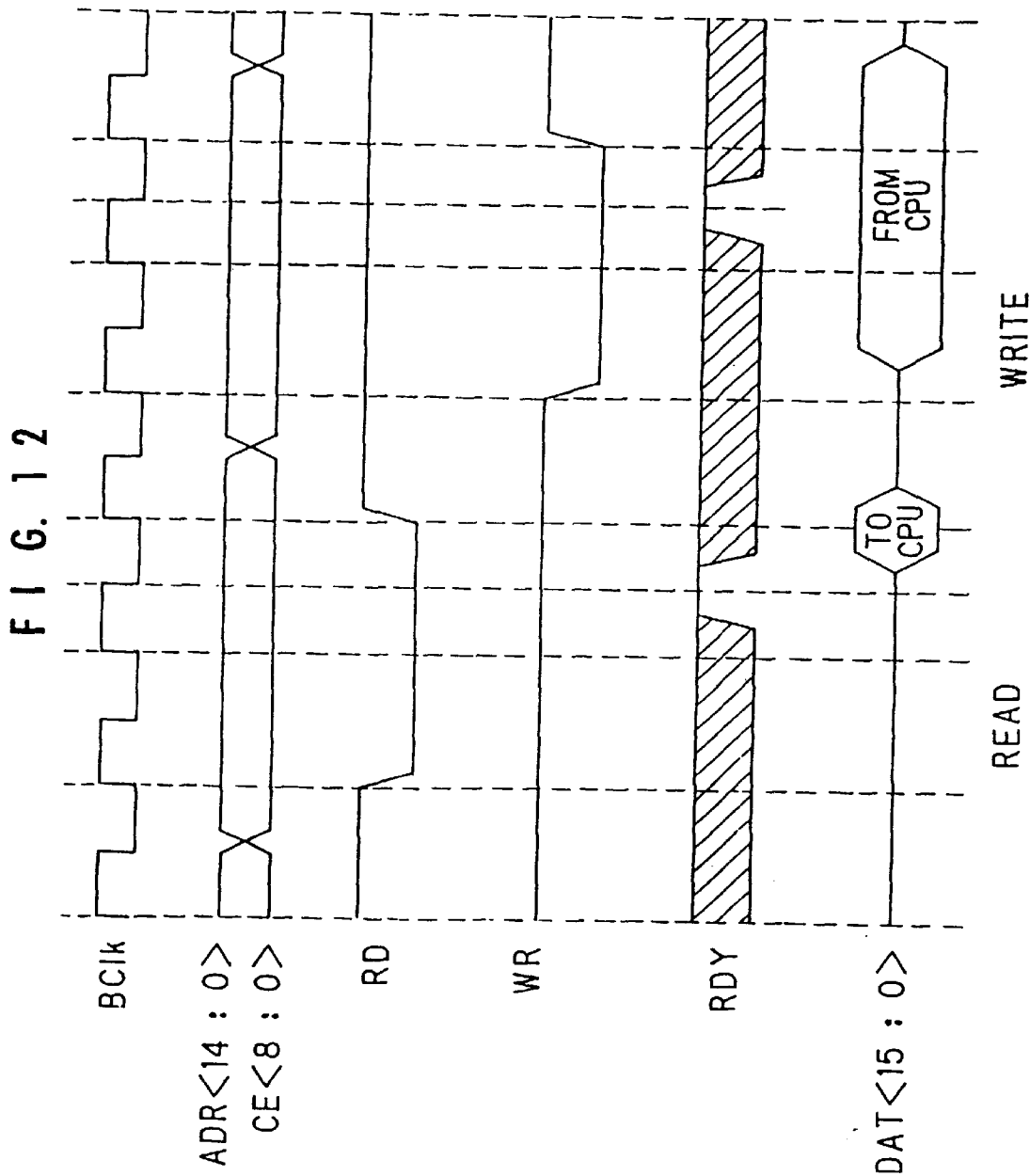
FIG. 12 is a timing chart showing operation of a basic 3—3 bus cycle, according to the first preferred embodiment.

As shown in FIG. 12, it takes three bus-clocks (BCLK) to access the I/O port (I/O space), and the operation is finished in response to a high level RDY signal. This operation is called a "basic 3—3 bus cycle." While the RDY signal is at low level, wait state signals may be inserted into the RDY signal to adjust access timing of the I/O space.

Figure 13:
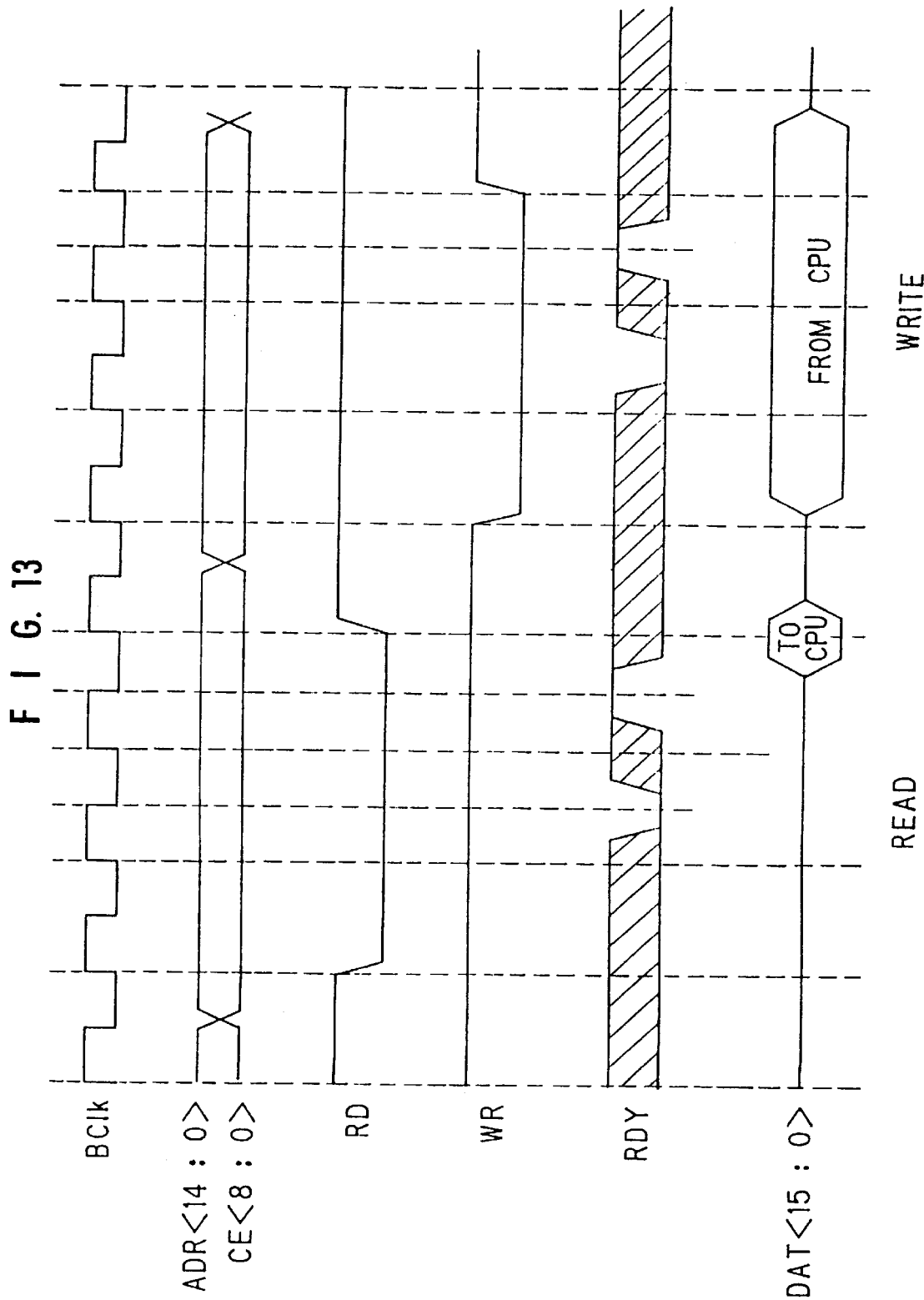
FIG. 13 is a timing chart showing operation of the basic 3—3 bus cycle including one wait state signal, according to the first preferred embodiment.

When one wait state signal is inserted into the RDY signal, as shown in FIG. 13, it takes four bus clocks to access the I/O space. This operation is called a "4—4 bus cycle."

As described above, according to the first preferred embodiment, programmers can design a program without being conscious of access timing, because the CPU controls access timing by itself. As a result, memory space used for the program may be reduced.

Figure 14:
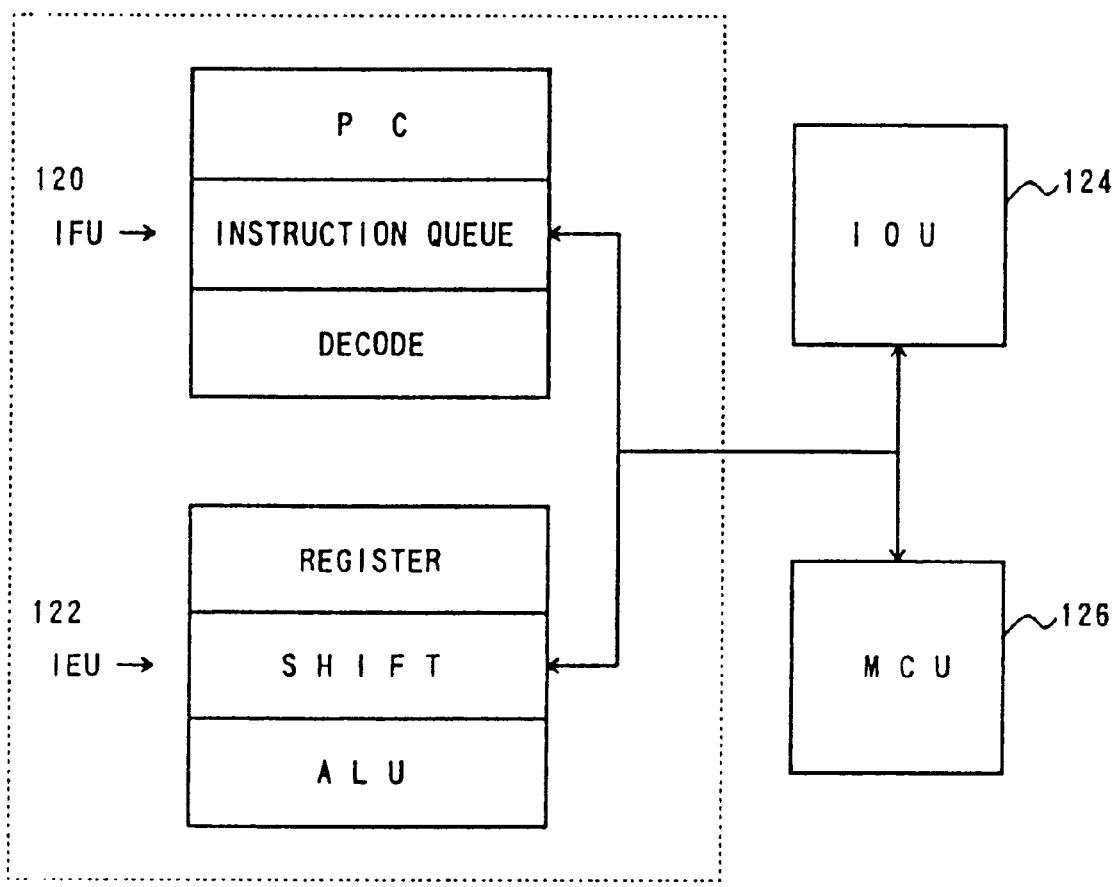
FIG. 14 is a block diagram illustrating the internal architecture of a CPU, according to a second preferred embodiment.

FIG. 14 shows the internal architecture of a CPU according to a second preferred embodiment. The architecture includes an instruction fetch unit (IFU) 120, an instruction execution unit (IEU) 122, an I/O control unit (IOU) 124 and a memory control unit (MCU) 126. MCU 126 generates all control signals to control a memory port connected to a main memory DRAM. In this architecture, data are treated for each eight bits, so that data are treated for each byte or integral byte multiples. In this system, one word is indicated by 4 bytes (32 bits).

The DRAM is composed of some memory arrays, the number of words (depth in address direction) contained in each array being different depending on the depth in address direction of the chip. That is, for example, a "256×n" type of DRAM has memory arrays each having 256k words. The number of chips forming each array is defined by the number of data ports of the DRAM.

FIG. 15 shows the DRAM of 256k-word size.

FIG. 16 shows specifications for different types of DRAMs. In this embodiment, different types of DRAMs 64k×16, 128k×8, 256k×4, 256k×16, 512k×8 and the like may be employed. Such memory types may be specified by a memory specifying register. These memories are controlled by the CPU when the memory system information has been supplied to the MCU. If such a memory system is used in a conventional system, a decode IC is necessary to decode data.

Figure 17A:
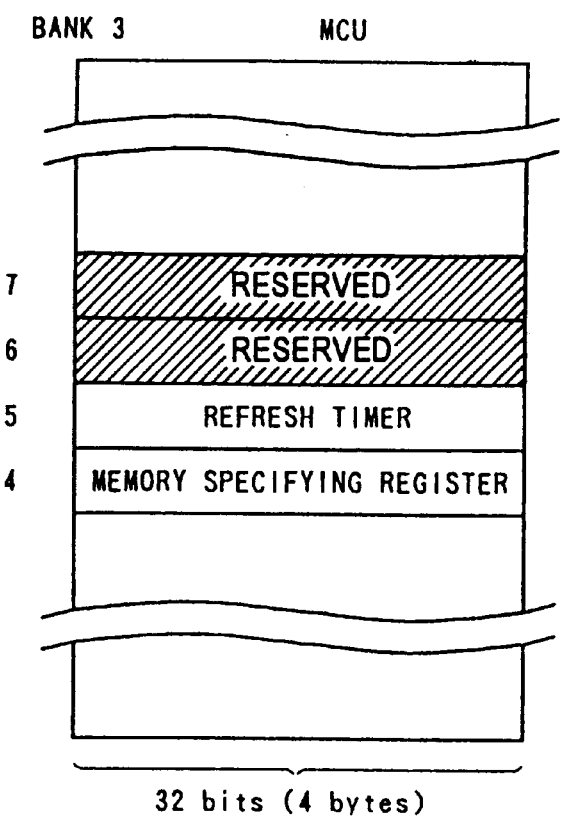
FIG. 17A is a diagram illustrating the configuration of an MCU (Memory Control Unit), according to the second preferred embodiment.

The system has a register in the MCU to specify the configuration of the memory to set a refresh time by a predetermined program. The register may be addressed in accordance with a special register transmitting instruction. The register is mapped in a special hardware register region (bank 3, address 4–7), as shown in FIG. 17A. A memory specifying register region takes 32 bits (4 bytes) at the address 4 in the bank 3. An area for instructing refresh time is taken at the address 5 in the same bank. The content of the memory specifying register is as follows:

| ROW_SIZE | |
|---|---|
| 000 | 8 bits |
| 001 | 9 bits |
| 010 | 10 bits |
| 011 | 11 bits |
| 100 | 12 bits |
| COL_SIZE | (column size) |
| 00 | 8 bits |

-continued

| | |
|---|---|
| 01 | 9 bits |
| 10 | 10 bits |
| 11 | 11 bits |
| ARRAYS | (array size) |
| 0 | 1 array |
| 1 | 2 arrays |
| REFRESH_EN | (refresh enable) |
| 0 | refresh disable |
| 1 | refresh enable |

Figure 17B:
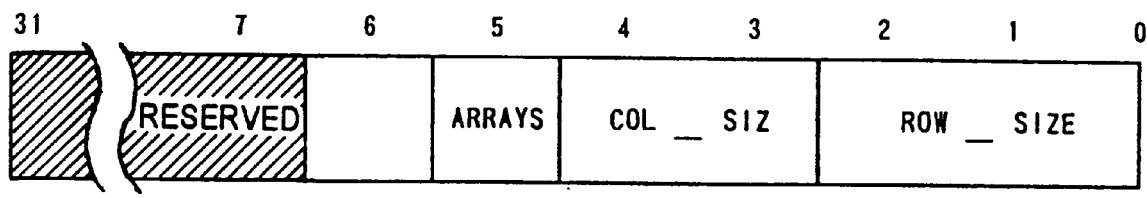
FIG. 17B is a diagram illustrating the configuration of a memory specifying register, according to the second preferred embodiment.

The DRAM system is defined by the combination of "ROW_SIZE" and "COL_SIZE". For example, when the "ROW_SIZE"=2 (=(010)$^2$, that is, 10 bits) and "COL_SIZE"=1 (=(01)2, that is, 9 bits), a DRAM of 512k×8 (ROW×COL=10×9) is instructed to be set as shown in the table of FIG. 17B. Further, a type of a 1 array—4 chips is specified when "ARRAYS=0" is held in the register.

Figure 18:
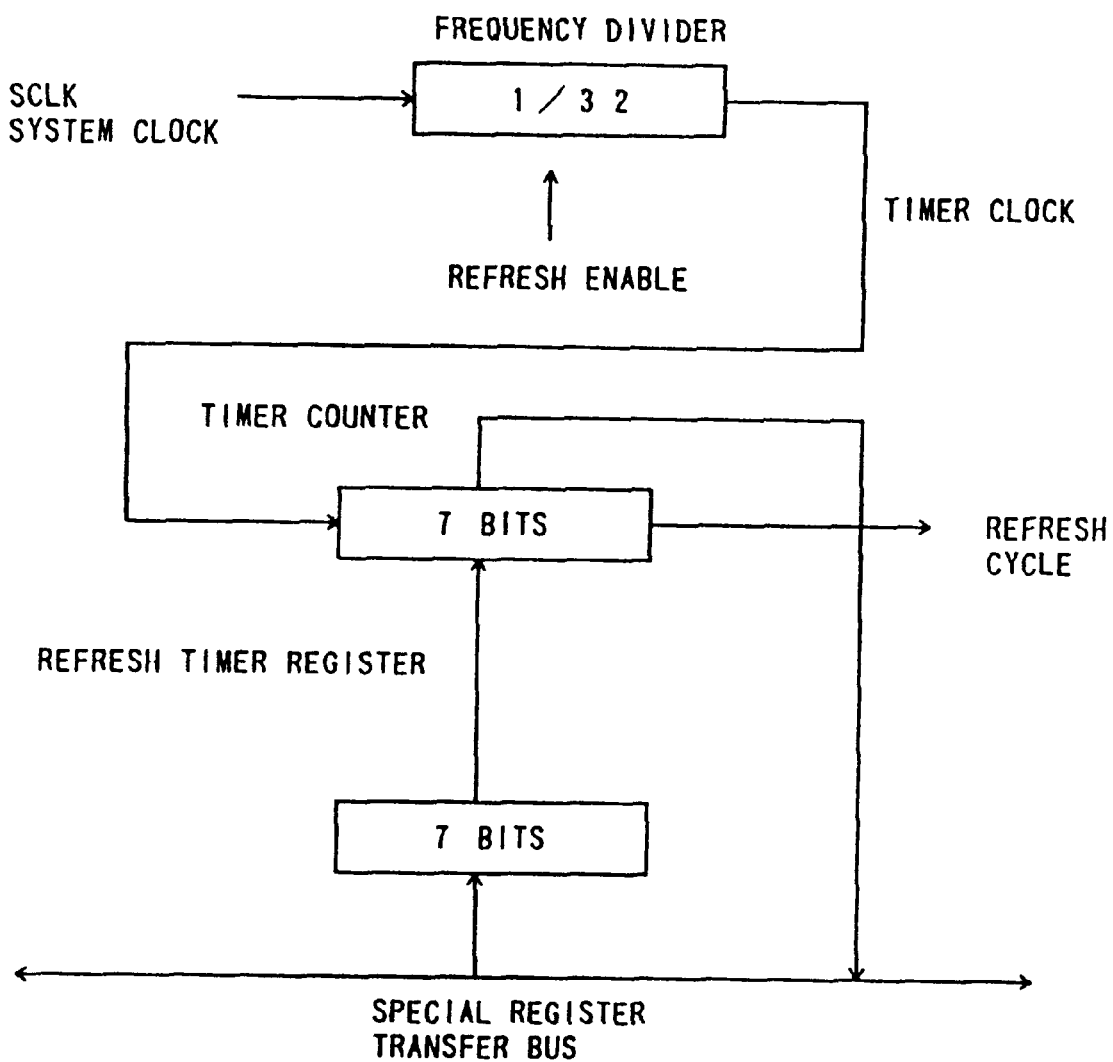
FIG. 18 is a block diagram illustrating the architecture of a refresh timer, according to the second preferred embodiment.

Next, refresh cycle operation of this system will be explained in conjunction with FIG. 18. In general, when a DRAM is not accessed in a predetermined period, data stored in the memory is erased. For that reason, it is necessary to refresh the memory (that is, to electrically activate it) at predetermined intervals. The MCU has a refresh timer which includes a frequency divider, a refresh timer register and a timer counter. The frequency divider divides the frequency of a system clock to generate a timer clock having a frequency of one thirty-second (1/32) that of the system clock. The timer counter receives timer clock signals. Refresh cycle (time) is programmable and varies depending on the configuration of the DRAM.

The memory refresh operation is controlled by data stored in 0 to 6 bits regions of the refresh timer register, as shown in FIG. 17B. The control operation is automatically carried out by the ports. When the memory specifying register provides a refresh enable instruction, the refresh cycle is determined in accordance with contents of the timer counter and refresh timer register, whereby the memory is refreshed at predetermined intervals.

When the CPU supplies data to the refresh timer (bank 3, address 5), the data are written in the timer register. On the other hand, the CPU reads data from the timer counter of the refresh timer. The timer register assumes a zero state after reset. Refresh operation is required at each time when the timer counter finishes counting (0×7F, that is 7F of hexadecimal notation). The timer counter continues to count the clocks for each timer clock cycle, and then the timer counter is initialized in accordance with data stored in the refresh timer register when the counting is finished.

In order to assure that the DRAM on a memory port is refreshed at the rated timing, figures to be used for controlling a period of memory refresh cycle are loaded in the refresh register. The refresh timer register stores predetermined figure data, which are calculated by a program using a DRAM refresh period, a DRAM refresh cycle and a clock period of the timer clock. That is, the figure data are given by the following equations.

REFRESH TIMER=0×7F−CYCLE NUMBER

CYCLE NUMBER=REFRESH INTERVAL/CLOCK PERIOD

REFRESH INTERVAL=REFRESH PERIOD/REFRESH CYCLE NUMBER

The MCU employs a "CAS before RAS refresh system", so that address data are not necessary to be supplied to the DRAM for each refresh cycle.

Figure 1:
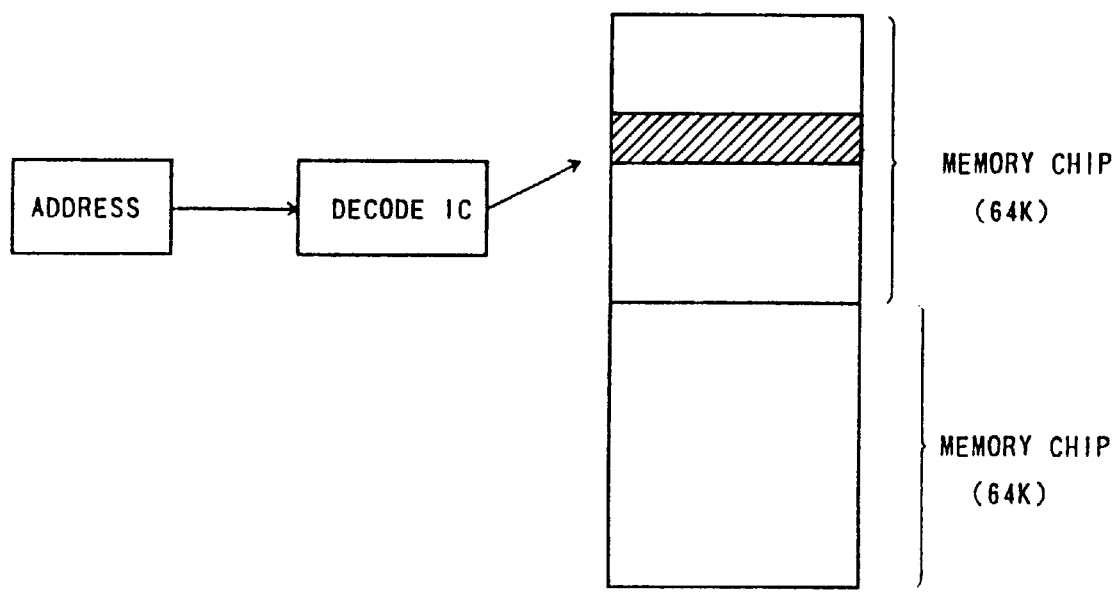
FIG. 1 is an explanatory diagram showing operation for addressing a memory using a decode IC, according to a conventional computer system.
Figure 2:
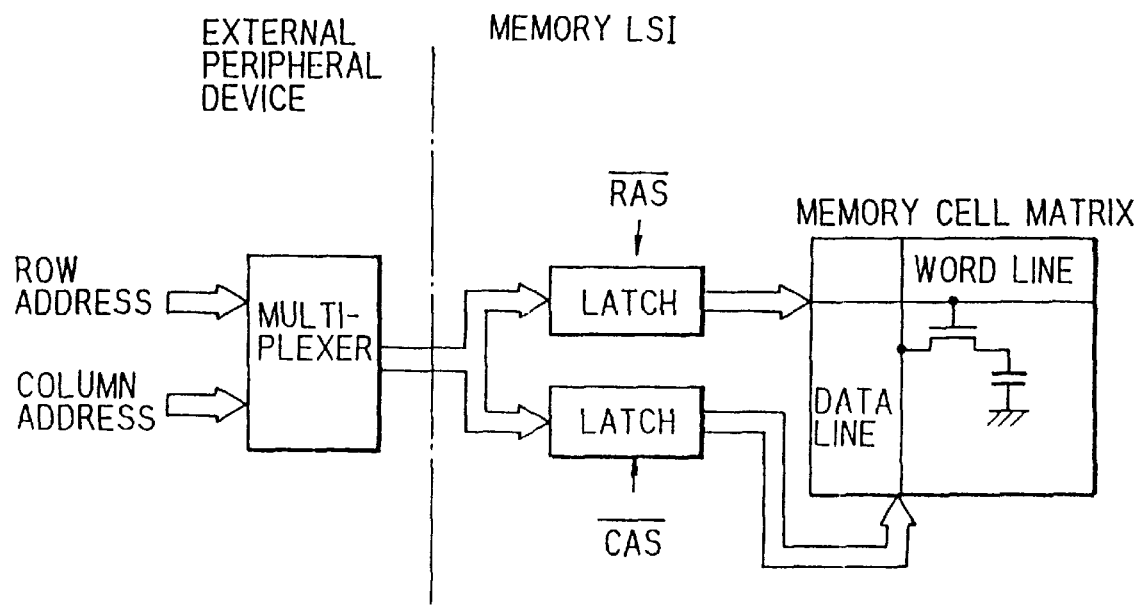
FIG. 2 is an explanatory diagram showing a multiplexer system, according to the conventional computer system.
Figure 3:
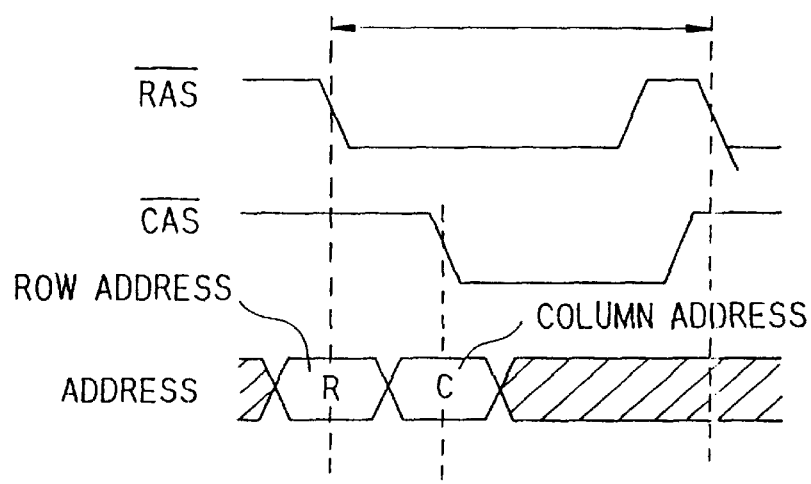
FIG. 3 is a timing chart showing operation for addressing the memory, according to the conventional system.
Figure 4:
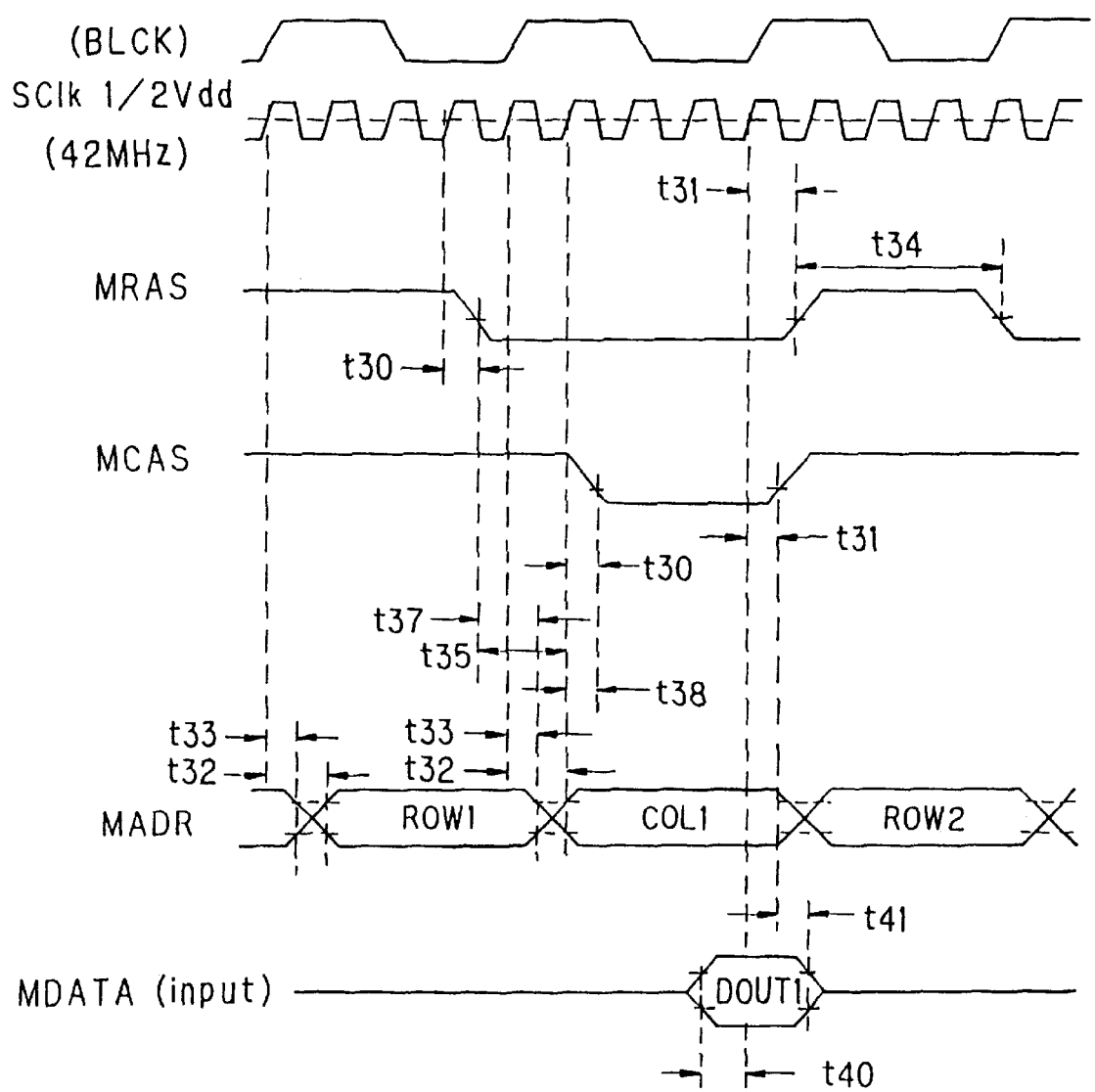
FIG. 4 is a timing chart showing a read cycle in a page mode, according to the conventional system.
Figure 5:
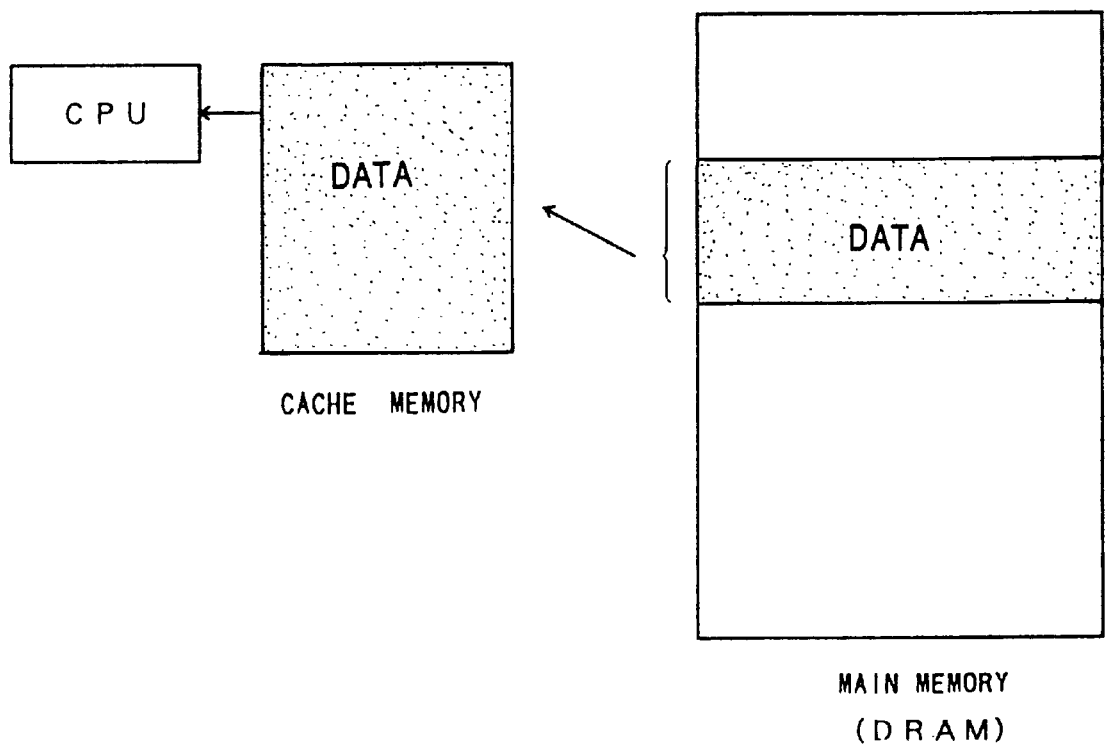
FIG. 5 is an explanatory diagram showing operation for accessing the memory using a cache memory, according to the conventional system.
Figure 6:
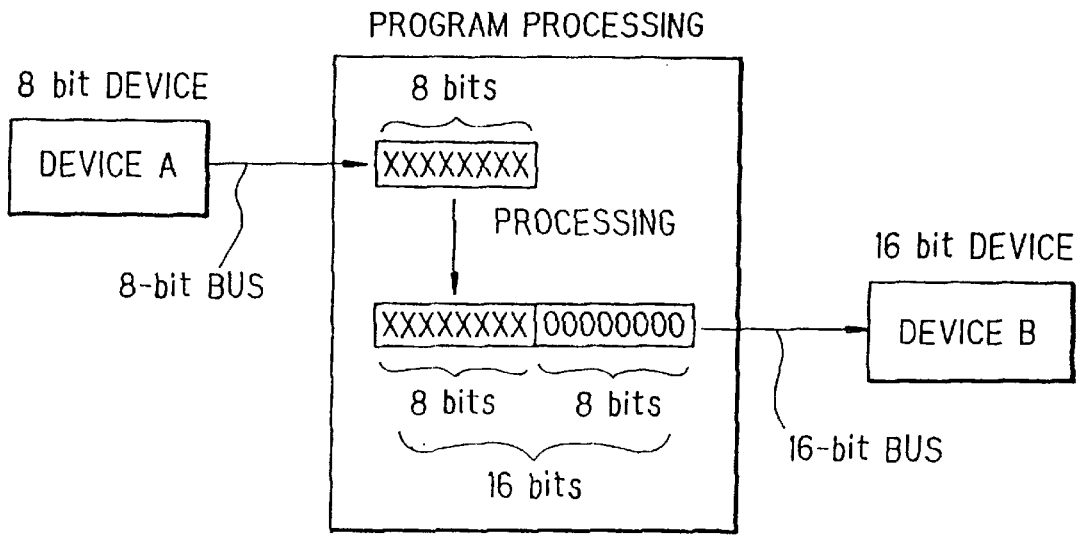
FIGS. 6 and 7 are explanatory diagrams each showing operation for transmitting data, according to the conventional system.
Figure 7:
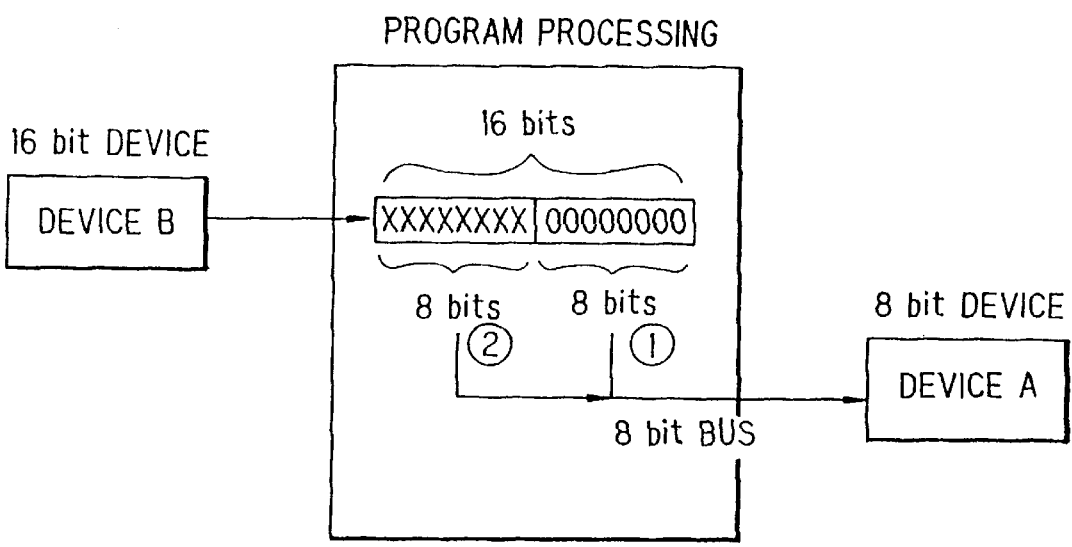
Figure 8:
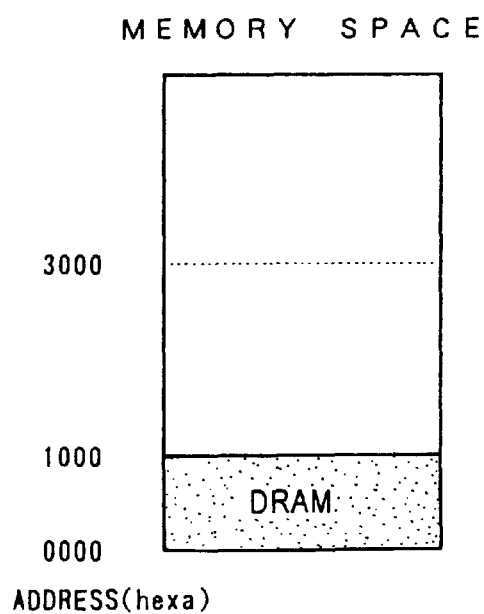
FIG. 8 is a diagram illustrating a memory space, according to the conventional system.
Figure 9:
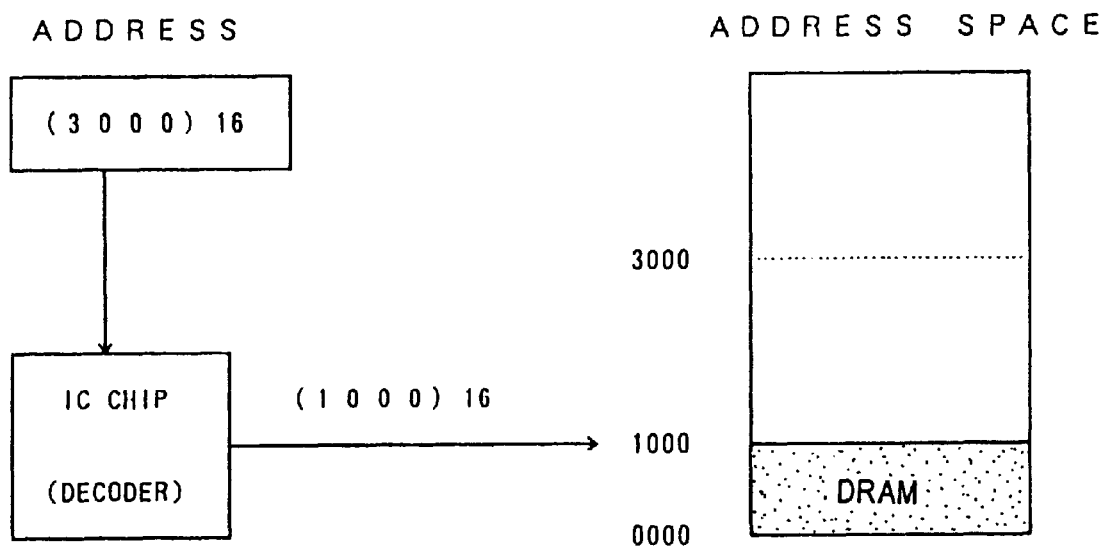
FIG. 9 is a diagram showing operation for addressing the memory using an address decoder, according to the conventional system.

Next, how to address the memory by the MCU will be explained. When an address signal is supplied to the MCU, the signal is divided into row, column and array signals. The dividing method is different depending on the memory configuration, for example, a DRAM of 64×16 is addressed as shown in FIG. 7. An address bit system is given automatically when the type of the DRAM is determined, as follows:

ROW_SIZE=0

COL_SIZE=0

Figure 19A:
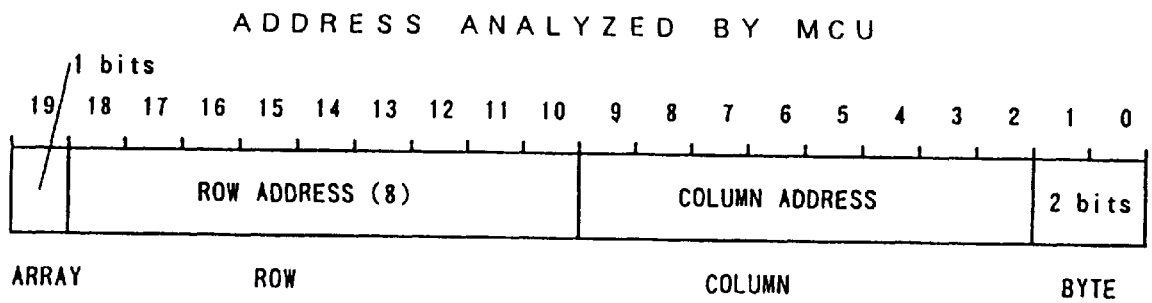
FIG. 19A is a diagram showing an address bit of a DRAM (64K×16), according to the second preferred embodiment.
Figure 19B:
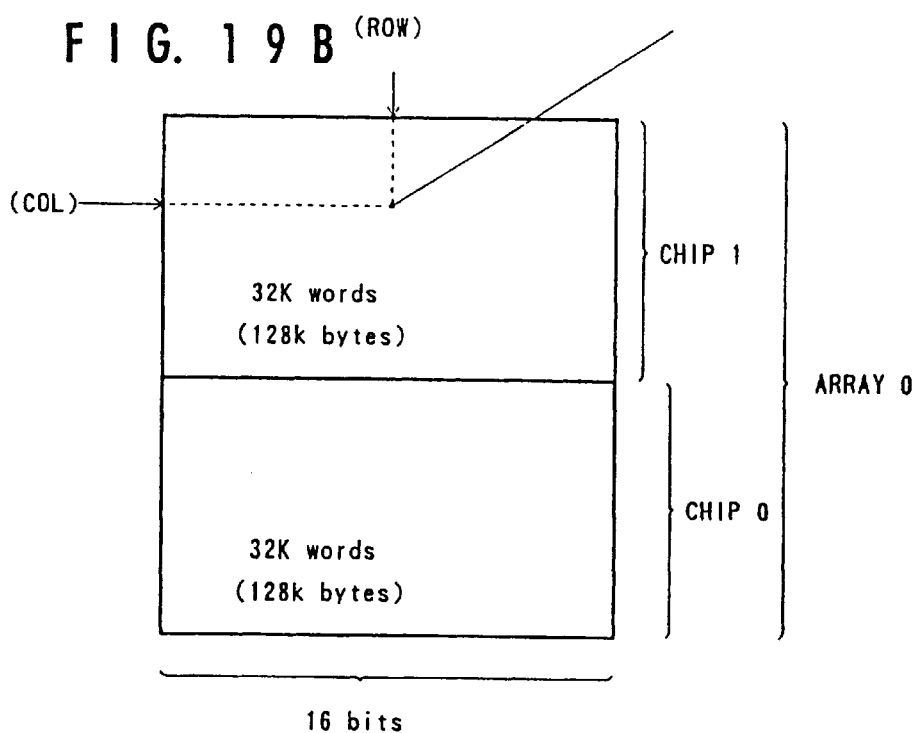
FIG. 19B is a diagram showing a memory map of a DRAM (64K×16), according to the second preferred embodiment.

When "ARRAY=0" is set in the register, the memory space has an area of 64K words (256K bytes), as shown in FIG. 19B. The cross point of row and column address signals supplied from the MCU becomes an address point.

When a DRAM of 128K×8 is used, the following instructions are set in the memory setting register:

ROW_SIZE=1

COL_SIZE=0

Figure 20A:
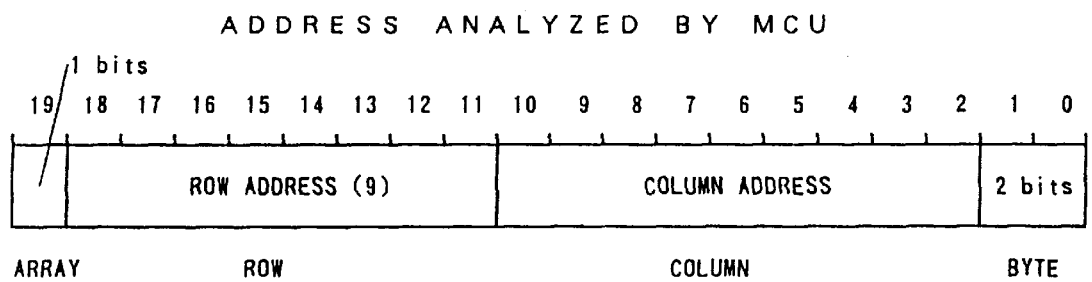
FIG. 20A is a diagram showing an address bit of a DRAM (128K×8), according to the second preferred embodiment.
Figure 20B:
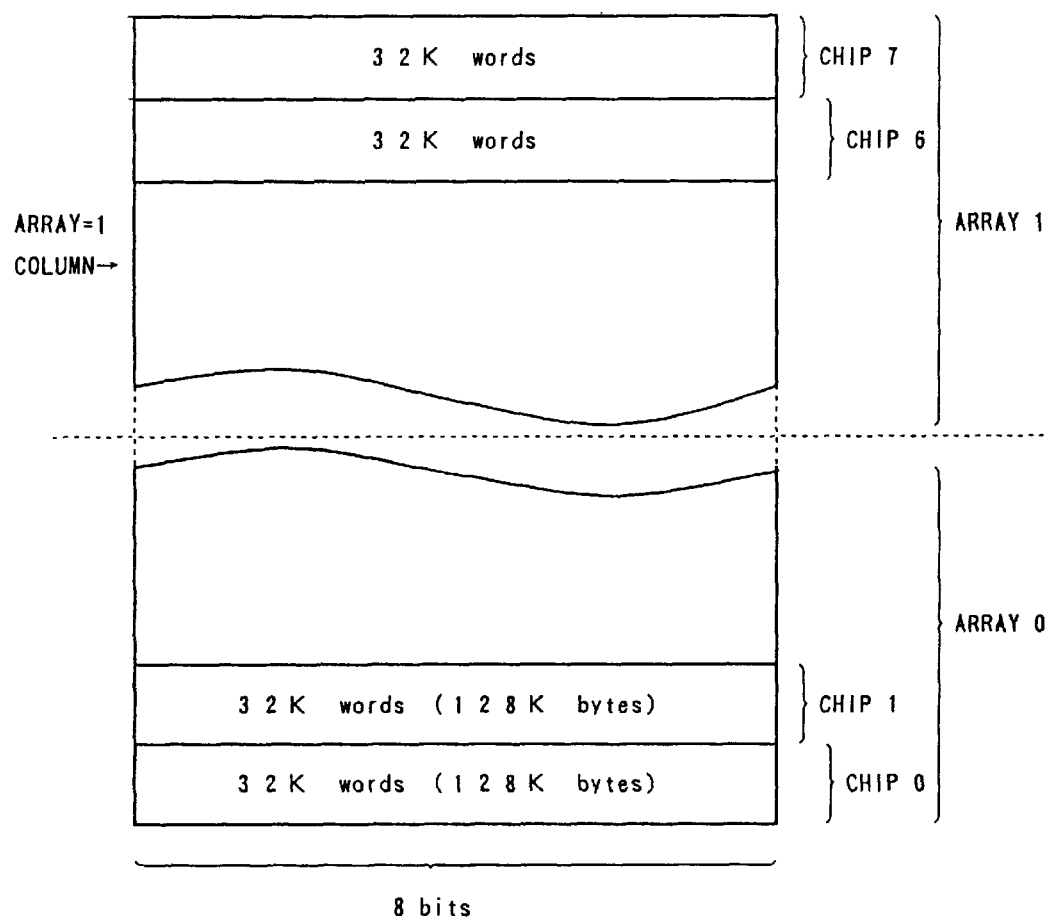
FIG. 20B is a diagram showing a memory map of a DRAM (128K×8), according to the second preferred embodiment.

In this case, the MCU forms row and column addresses of 8 and 9 bits, respectively, as shown in FIG. 20A. "ARRAY=1" is set in the register, so that two arrays 1 and 0 are formed in the memory map, and the memory has an area of 1M bytes (128K words×2).

Next, how to calculate the refresh time of the DRAM will be explained. When refresh period, refresh cycle, external clock and the clock frequency of a time clock are determined to be 4 ms, 256, 23 ns and 736 ns, respectively, refresh time is given as follows:

REFRESH INTERVAL=4,000,000 ns/256=115.625 ns

CYCLE=15.625 ns/736 ns=21.229

REFRESH TIME=0×7F−21=106

(0×=7F in hexadecimal)

While the calculated refresh time is set in the refresh timer register, the timer counter is refreshed in accordance with the refresh time.

The second preferred embodiment uses the computer system, shown in FIG. 10, used in the first preferred embodiment. In this embodiment, the MCU also has the function of a decode IC used in the conventional system. A memory configuration, and a memory refresh cycle which is different depending on the DRAM, are specified by programming.

Figure 21:
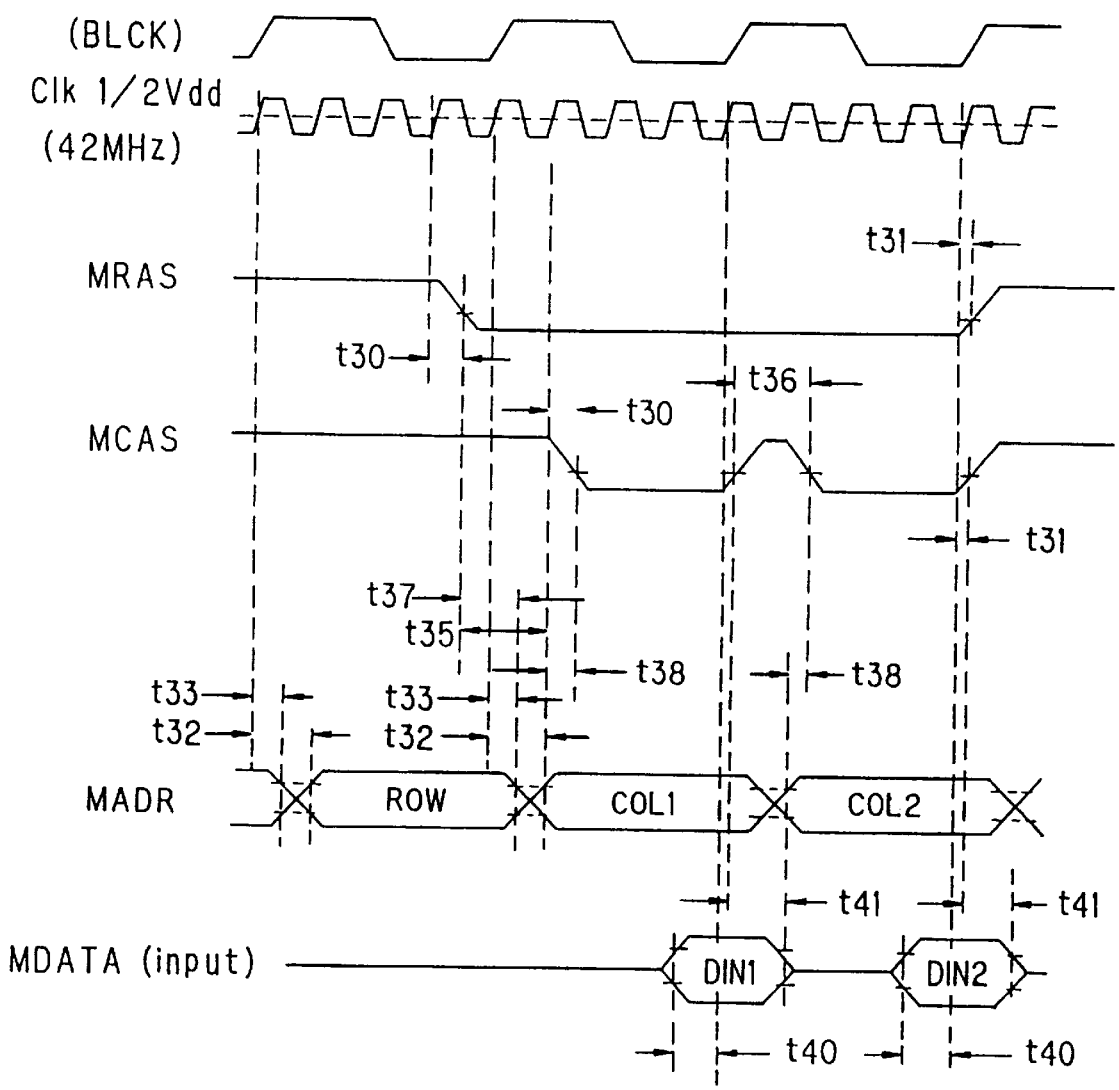
FIG. 21 is a timing chart of a read cycle in a fast page mode, according to a third preferred embodiment.

A third preferred embodiment is now explained, in which a CPU may access a main memory at a high speed without a cache memory. In this embodiment, the CPU memorizes a first RAS (Row Addressing) cycle so that data can be read continuously from the memory according only to a CAS (Column Addressing) cycle, as shown in FIG. 21. Therefore, the RAS cycle having a length of 1BCLK may be omitted after starting of reading, it being called a "fast page mode access."

Next, the page mode access of the conventional system and a fast page mode access of the preferred embodiment are now compared with each other in the following program of the C-language:

char a[100] [2];

⋮ for (i=0; i<=99; i++)printf("%c",a[i] [0];

⋮

, where "printf" is a function including a read or write instruction to the memory or display. The above program means that odd characters in a two-dimensional character arrangement are displayed. In this program, "a" represents a DRAM of 16 bit shown in FIG. 22.

The odd characters are arranged at the lower bit side of the memory. The DRAM uses only one RAS, so that image data may be displayed only by changing the CAS in the fast page mode.

FIGS. 23 and 24 show the operations of the page mode and fast page mode accesses in the case of reading data, respectively. As shown in these figures, an access period for the fast page mode is half that for the page mode. The effect of the invention becomes more remarkable when many data are accessed.

According to the third preferred embodiment, the load of the hardware is reduced, because the system uses no cache memory.

Figure 25:
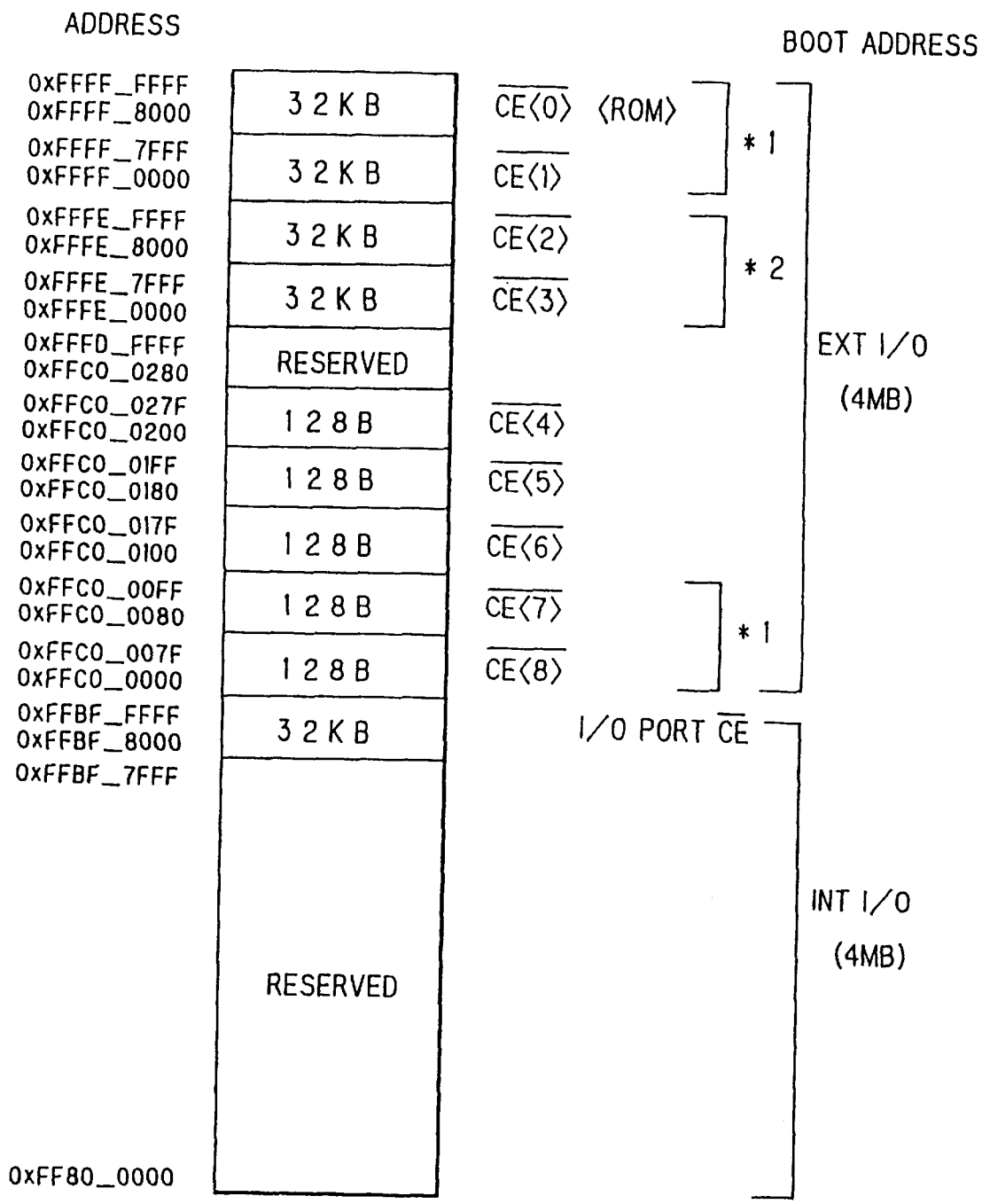
FIG. 25 is a diagram showing an I/O memory map of a CPU, according to a fourth preferred embodiment.

A fourth preferred embodiment is now explained in conjunction with FIGS. 25 to 29. In FIG. 25 showing an I/O map managed by a CPU, each pin with "*1", such as CE(0) and CE(1), is for 8 bit device, and the other pins CE(4), CE(5), and the like, are for 16 bit devices. Each bus connected to corresponding pin supports dynamic bus sizing. Double bus sizing is determined for each clock cycle. A slave or address decode logic circuit detects an existence of an 8 bit device.

Figure 26:
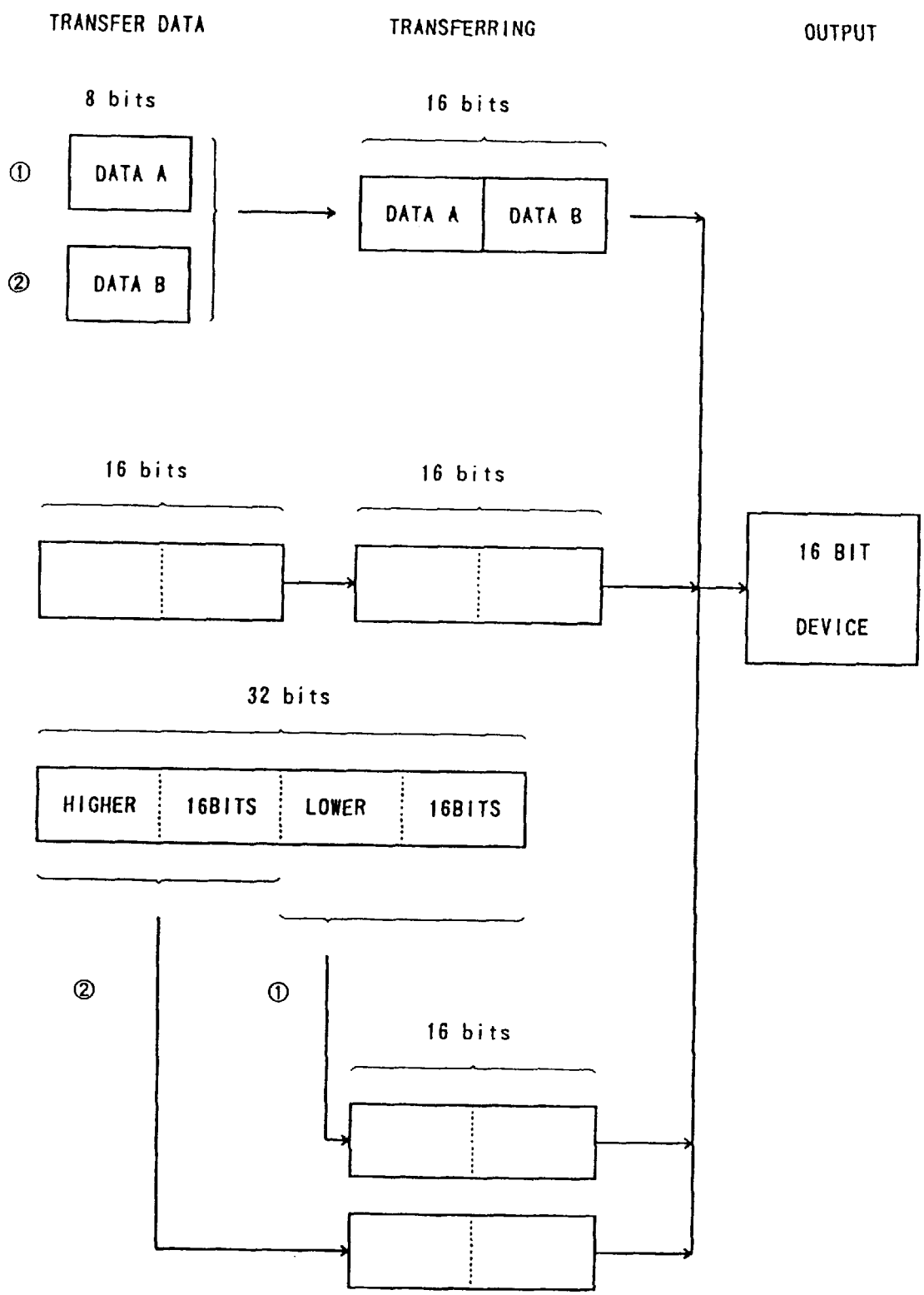
FIGS. 26 and 27 are diagrams illustrating operation for transmitting the different types of data, according to the fourth preferred embodiment.
Figure 27:
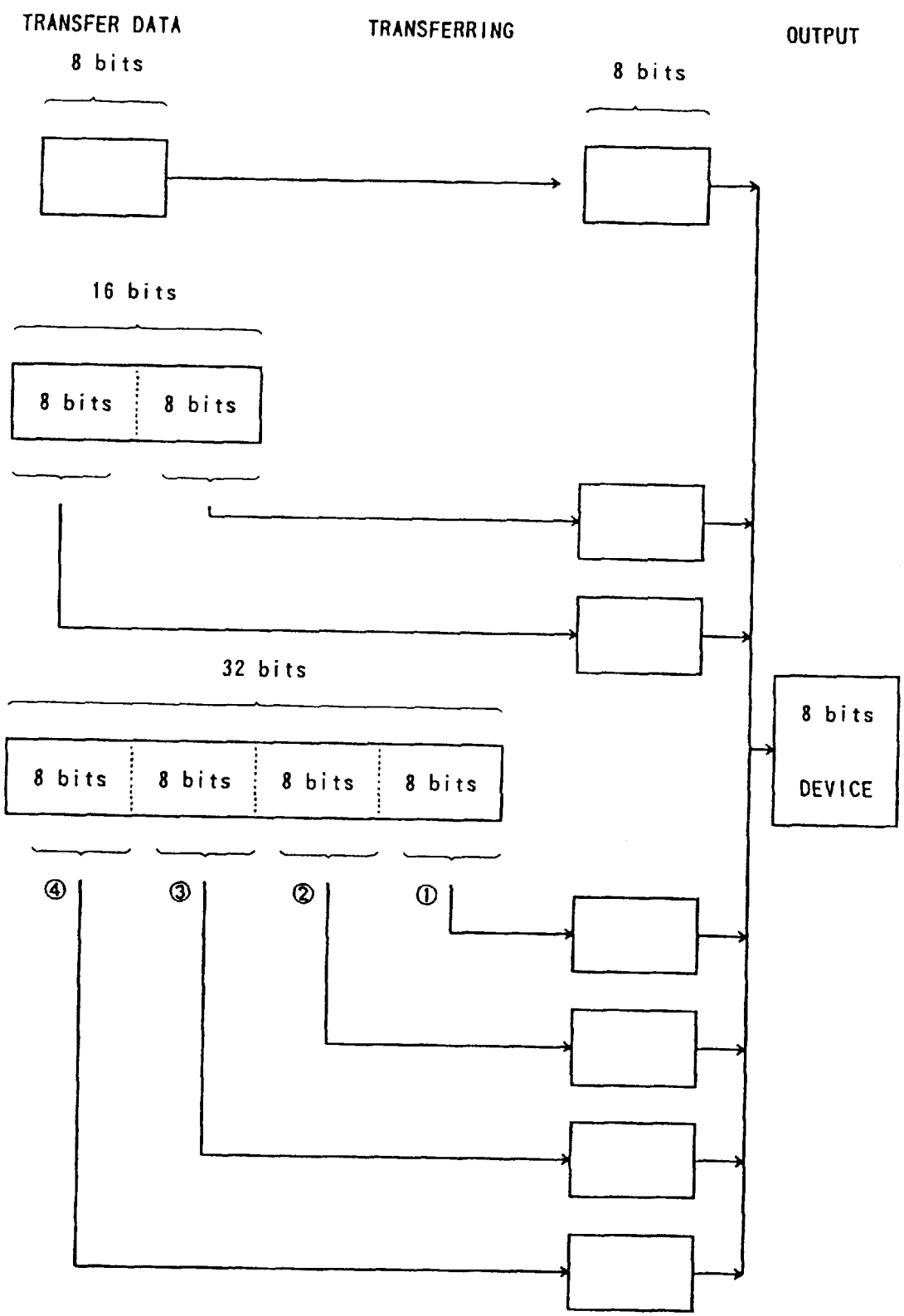

The CPU judges the size of data to be transferred, whether 8 bits (SIZE 8) or 16 bits (SIZE 16), to control the transmission. That is, for instance, two pieces of 8 bit data are coupled to form 16 bit data to be transmitted to a 16 bit device, as shown in FIG. 26. 32 bit data are divided into two segments of 16 bit data to be transmitted to the 16 bit device. On the other hand, 16 and 32 bit data are divided into 2 and 4 of 8 bit data, respectively, to be transmitted to a 8 bit device, as shown in FIG. 27.

Figure 28:
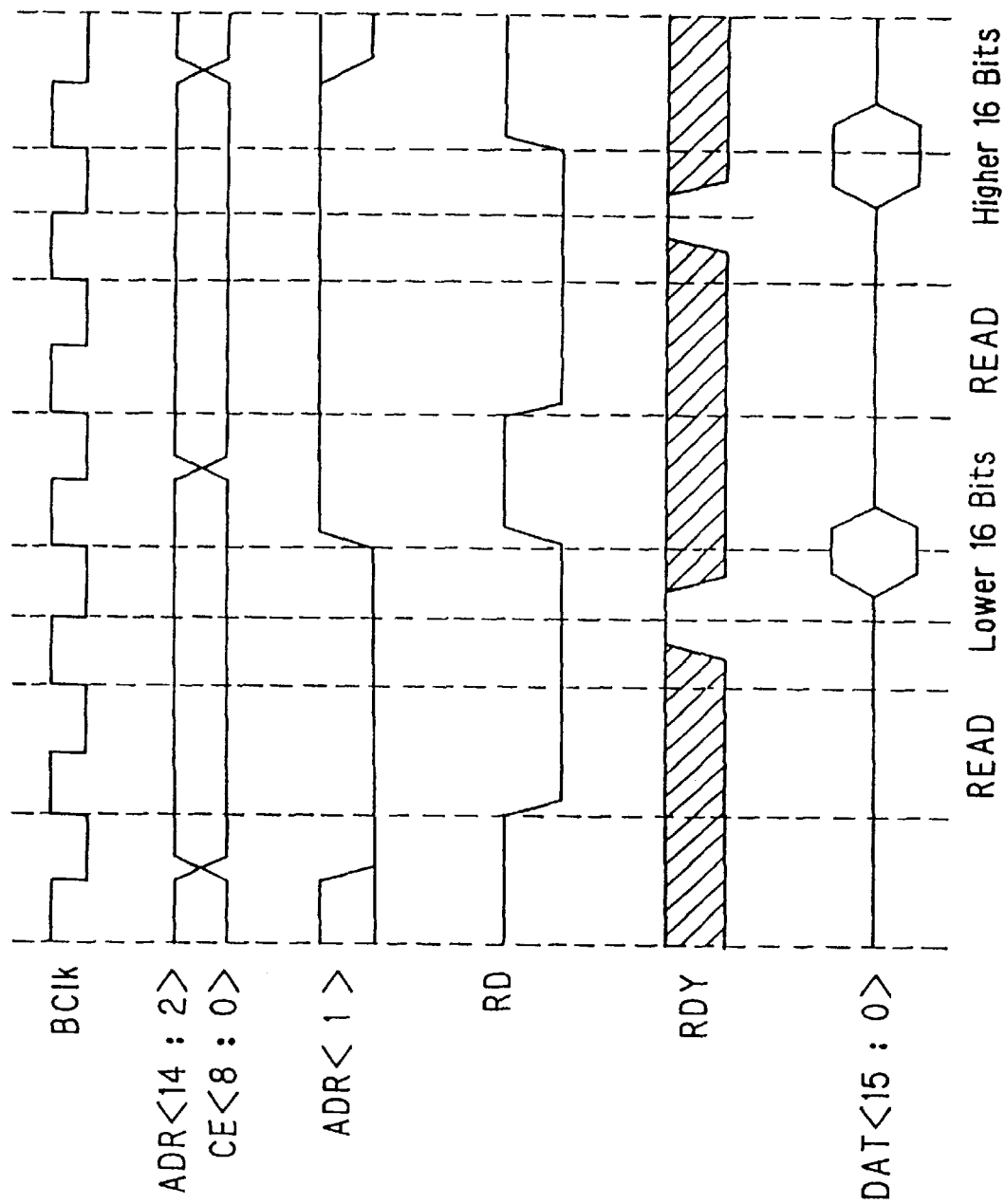
FIGS. 28 and 29 are time charts showing the different types of read cycles, according to the fourth preferred embodiment.

FIG. 28 shows a read cycle for reading 32 bit data from a 16 bit device. In this case, data are not read until RDY signal attains high level. The 32 bit data are divided into two segments of 16 bit data to be transferred twice, the operation being called a "multi-cycle."

Figure 29:
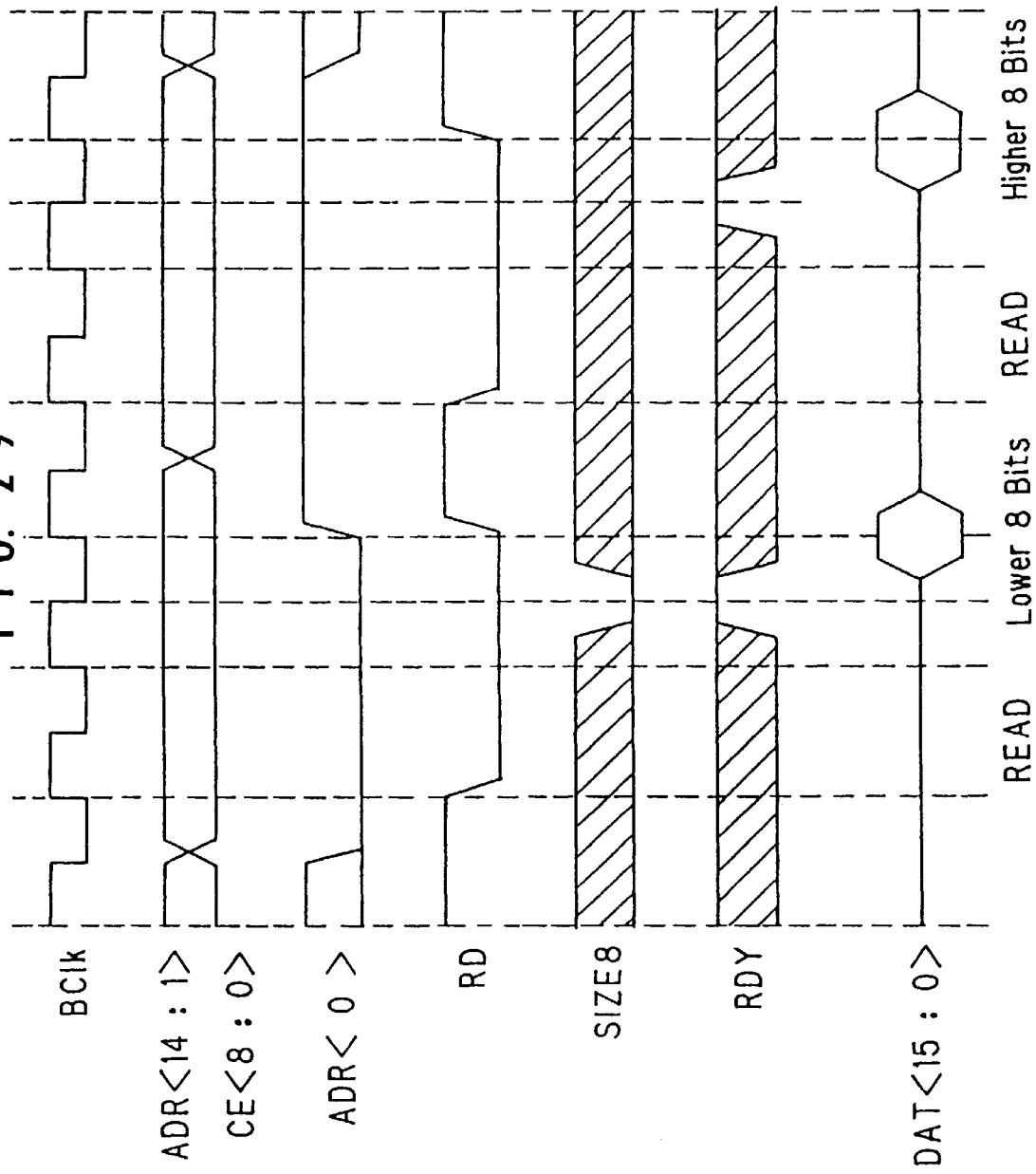

FIG. 29 shows a read cycle for reading 16 bit data from a 8 bit device. In this cycle, 8 and 16 bit devices may be connected to each other by using the SIZE 8 pin. The 16 bit data are divided into two segments of 8 bit data to be transferred twice in the "multi-cycle." Above mentioned, operation is controlled by the CPU.

According to the fourth preferred embodiment, a program for accessing the memory becomes easy to be designed, because the CPU adjusts the length of data to be transmitted. On the other hand, in the conventional system, dummy data (zero data) are added to original data to adjust the length of the original data, and as a result, the transfer speed is decreased.

A fifth preferred embodiment is now explained, in which the configuration of a memory is specified by a program without an address IC chip, so that the memory may be accessed by a CPU directly. The configuration of the memory is specified by a memory setting register of 32 bits. The configuration of the memory is defined by "ROW_SIZE," COL_SIZE" and "ARRAYS," as shown in FIG. 16, as follows:

ROW_SIZE<2:3>: number of bit for row address
COL_SIZE<4:3>: number of bit for column address
ARRAYS<5>: number of array
REFRESH_EN<6>: refresh enabling
, where <n:m> and <n> represent that the information is arranged in a range of "m"th bit to "n"th bit, and at "n"th bit, respectively.

Figure 30:
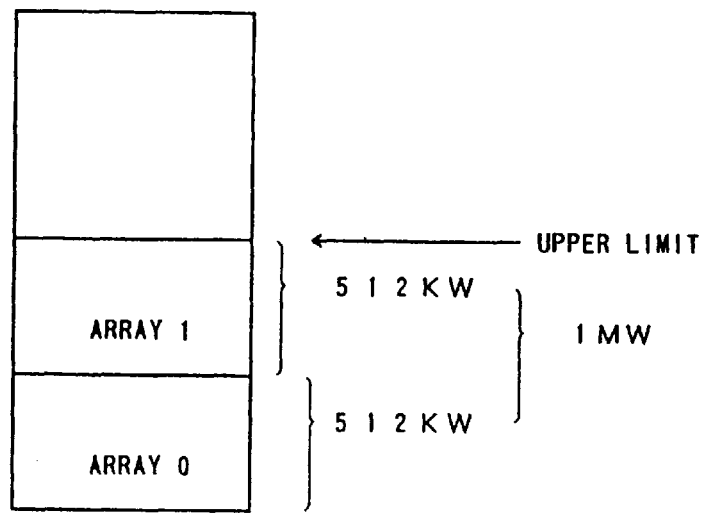
FIG. 30 is a diagram illustrating the configuration of a memory, according to a fifth preferred embodiment.

When the configuration of the memory is defined as follows in the memory setting register, the configuration becomes as shown in FIG. 30:

ROW_SIZE=10
COL_SIZE=9
ARRAYS=2

Figure 31:
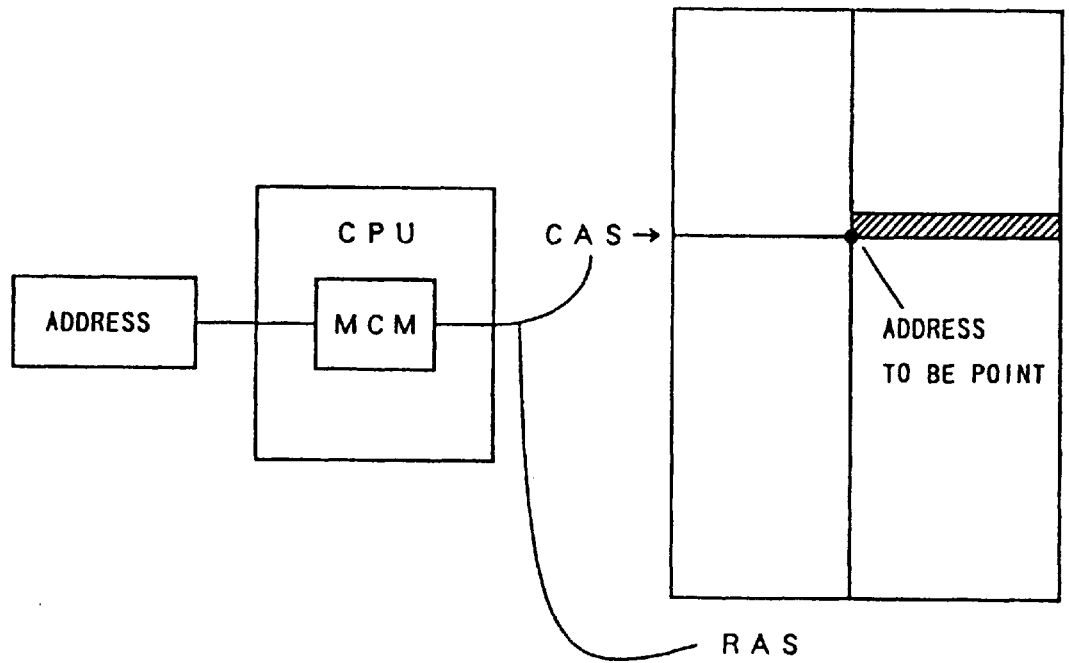
FIG. 31 is an explanatory diagram illustrating operation for addressing the memory using an RAS (row address) and a CAS (column address), according to the fifth preferred embodiment.
Figure 32:
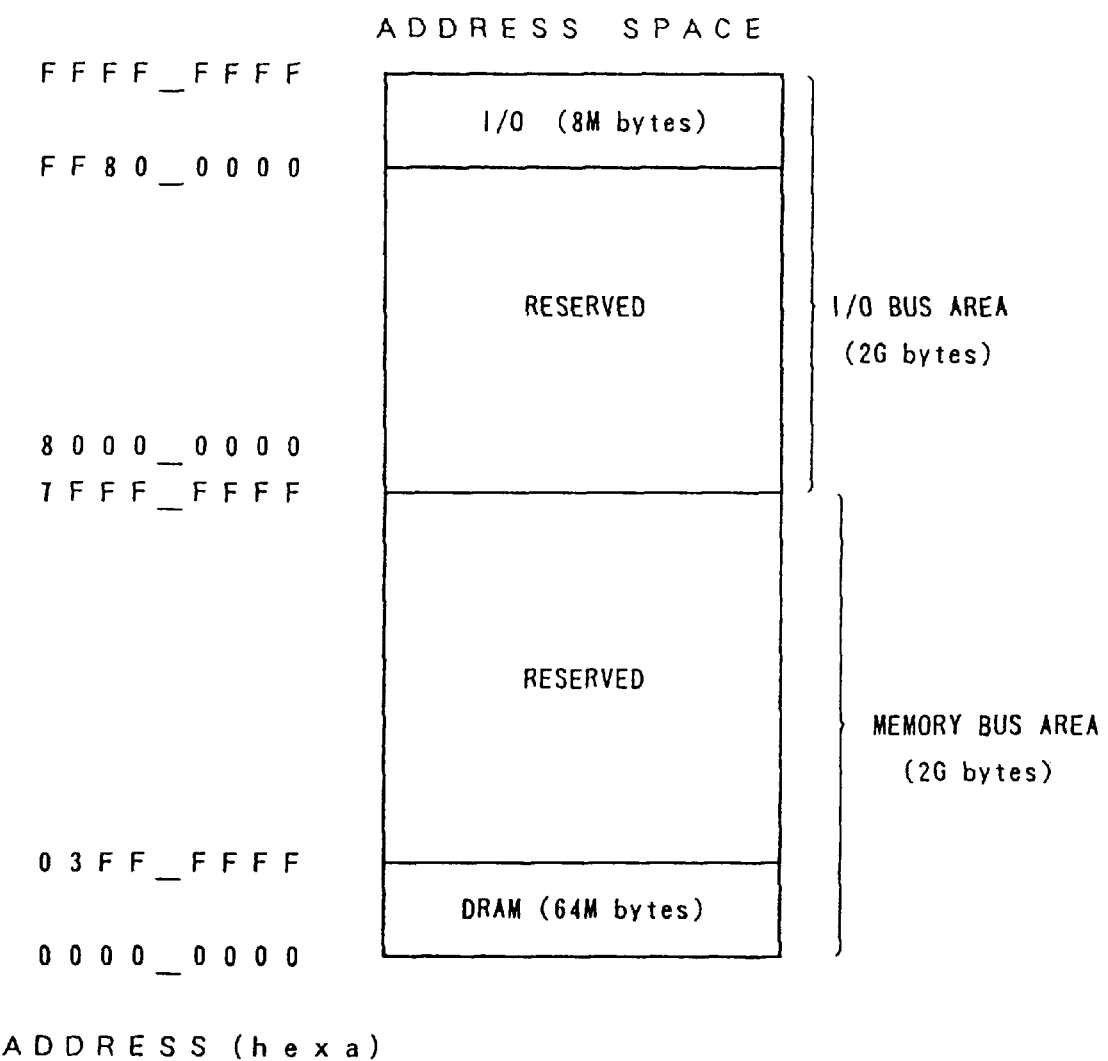
FIG. 32 is a diagram showing the address map of a CPU, according to the fifth preferred embodiment.

On the other hand, an address specified by a program is processed to provide RAS and CAS signals by an MCU (Memory Control Unit), so that the memory is addressed in accordance with the RAS and CAS signals, as shown in FIG. 31. In this addressing process, if an area out of the actual memory space is addressed, an exceptional error signal is generated based on the memory configuration by the CPU, this function being called an "area protection break."

Next, the CPU of the 32 bit type according to the fifth preferred embodiment will be explained. The CPU includes an instruction fetch unit (IFU), an I/O control unit (IOU) and a memory control unit (MCU). The CPU has memory bus and I/O spaces of 2G bytes.

Figure 33:
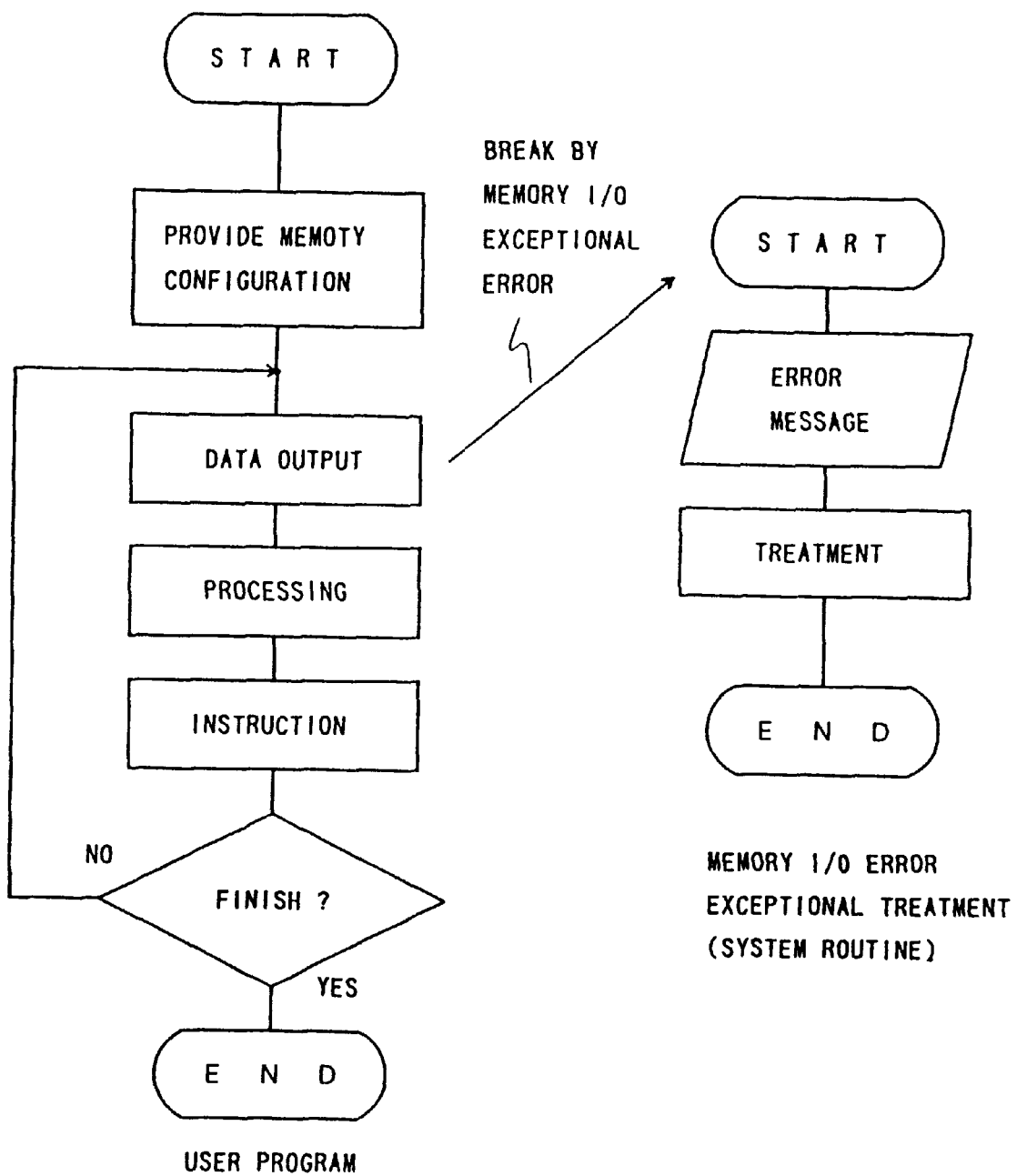
FIG. 33 is a flow chart showing operation for accessing the memory, which includes memory I/O error exceptional treatment, according to the fifth preferred embodiment.

In this embodiment, when data are written in a memory area with the address out of the actual memory, the current routine is transferred to an I/O error exceptional treatment in accordance with a break by an I/O error exception, as shown in FIG. 33. In this exceptional treatment routine, an error message is generated, so that a user can find the error location by checking the instruction for accessing the memory or I/O space and address data located around the instruction.

Figure 34:
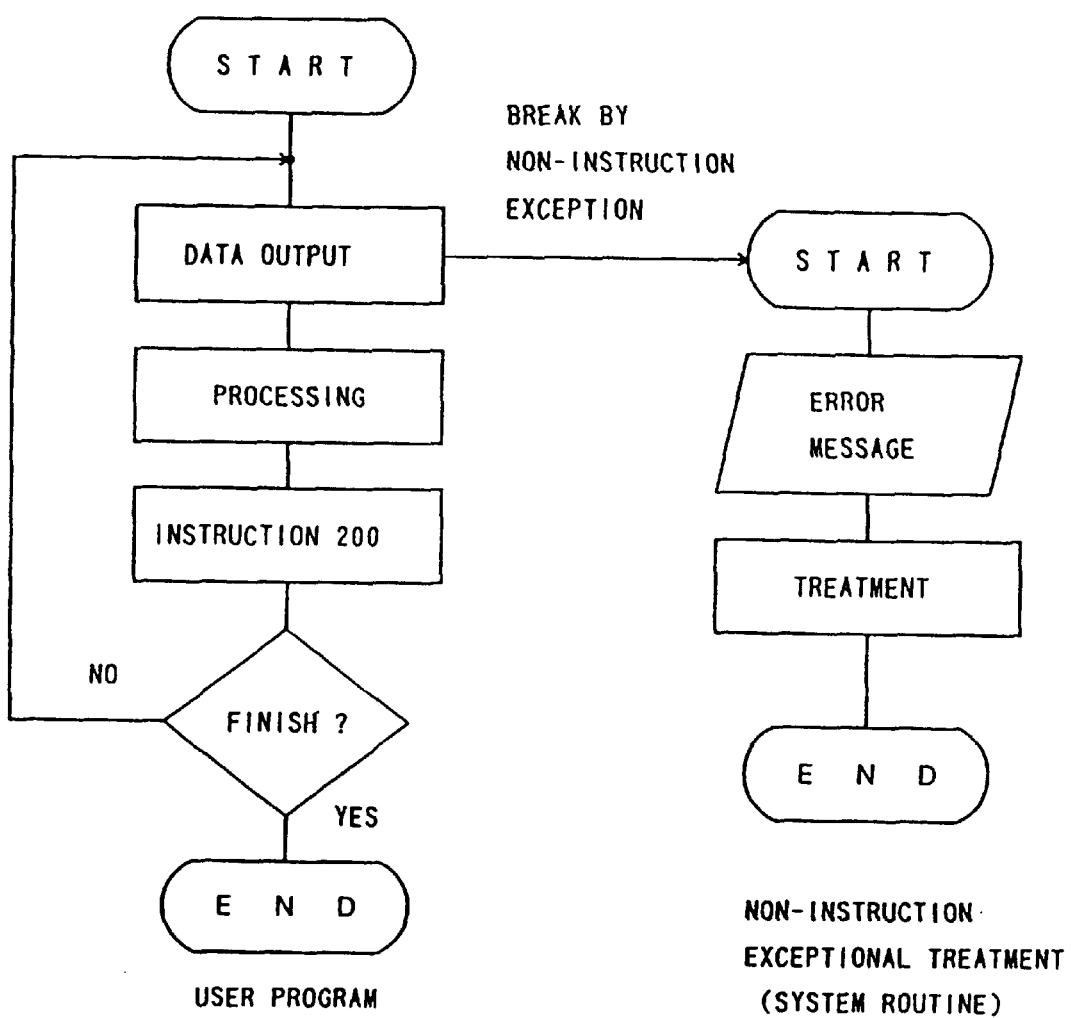
FIG. 34 is a flow chart showing operation for accessing the memory, which includes non-instruction exceptional treatment, according to the conventional system

FIG. 34 shows the operation of a conventional system for the same processing as the fifth preferred embodiment, shown in FIG. 33. In the conventional system, a memory is addressed by a memory IC chip (address decoder), and therefore, it is not necessary to specify the configuration of the memory by a register. It is assumed that an instruction 200 is defective when data are written in a memory area with the address out of the actual memory. When the defective instruction is fetched by the CPU, it is judged that the instruction does not exist there because the instruction is defective, as shown in FIG. 34. After that, the current routine is transferred for non-instruction exceptional treatment in accordance with the error exception. In this exceptional treatment routine, an error message is generated to finish the program. It is possible to find that instruction 200 is not normal, based on the error message. However, the instruction is normal in a source program list, because the instruction is defective in processing. Therefore, it is difficult to find the error (bug).

According to the fifth preferred embodiment, it is easy to debug the program, because the error message shows the position where the error has occurred. This system is successful especially for a game computer, in which addresses are handles by using an assembler or C-language directly.

What is claimed is:

1. An information processing system, comprising:
    a CPU (central processing unit) for controlling the system;
    a main memory for storing data,
    an I/O device;
    a memory bus for connecting the main memory directly to the CPU at a first port thereof, at a first bus timing in accordance with an RDY signal; and
    an I/O bus for connecting the I/O devices to the CPU independently from the memory bus at a second port thereof, at a second bus timing in accordance with the RDY signal;
    wherein the CPU controls a number of wait state signals to be inserted into the RDY signal in accordance with a difference of the first bus timing and the second bus timing.

2. The information processing system of claim 1, wherein the first bus timing is different from the second bus timing.

3. The information processing system of claim 2, wherein the second bus timing specifies a 4—4 bus cycle.

4. The information processing system of claim 1, wherein the second bus timing specifies a 3—3 bus cycle.

5. The information processing system of claim 1, wherein the CPU is configured with an address space including a two-gigabyte memory space and a two-gigabyte I/O space, said memory bus for transferring data within the memory space and said I/O bus for transferring data within the I/O space.

6. The information processing system of claim 5, wherein the information processing system is configured to implement a game computer system.

7. An information processing system, according to claim 1, wherein:

said I/O device is a controller unit for transmitting data to another I/O device connected to said I/O bus independently from said CPU.

\* \* \* \* \*